US011183887B2

(12) United States Patent
Arnitz et al.

(10) Patent No.: US 11,183,887 B2
(45) Date of Patent: Nov. 23, 2021

(54) NON-GAUSSIAN BEAMFORMING FOR WIRELESS POWER TRANSFER OPTIMIZATION

(71) Applicant: Searete LLC, Bellevue, WA (US)

(72) Inventors: Daniel Arnitz, Seattle, WA (US);
Jeffrey A. Bowers, Bellevue, WA (US);
Joseph A. Hagerty, Seattle, WA (US);
Russell J. Hannigan, Sammamish, WA (US); Guy S. Lipworth, Seattle, WA (US); David R. Nash, Arlington, WA (US); Matthew S. Reynolds, Seattle, WA (US); Clarence T. Tegreene, Mercer Island, WA (US); Yaroslav A. Urzhumov, Bellevue, WA (US)

(73) Assignee: Searete LLC, Bellevue, WA (US)

( * ) Notice: Subject to any disclaimer, the term of this patent is extended or adjusted under 35 U.S.C. 154(b) by 18 days.

(21) Appl. No.: 16/846,973

(22) Filed: Apr. 13, 2020

(65) Prior Publication Data

US 2020/0313466 A1    Oct. 1, 2020

Related U.S. Application Data

(63) Continuation of application No. 15/832,612, filed on Dec. 5, 2017, now Pat. No. 10,622,845.

(51) Int. Cl.
*H02J 50/70* (2016.01)
*H02J 50/23* (2016.01)
(Continued)

(52) U.S. Cl.
CPC ............ *H02J 50/70* (2016.02); *B64C 39/024* (2013.01); *H01Q 1/248* (2013.01); *H01Q 1/28* (2013.01);
(Continued)

(58) Field of Classification Search
CPC ........ B64C 2201/042; B64C 2201/066; B64C 39/024; H01Q 1/28; H01Q 15/0086;
(Continued)

(56) References Cited

U.S. PATENT DOCUMENTS 2,141,956 A    12/1938    Lord
2,725,026 A    11/1955    Brandt
(Continued)

FOREIGN PATENT DOCUMENTS

JP         5637319 B2      12/2014
JP       2016-201766 A     12/2016
(Continued)

OTHER PUBLICATIONS

Searete LLC, European Patent Application No. 18886481.3, Extended European Search Report dated Mar. 23, 2021, 7 pp.
(Continued)

*Primary Examiner* — Jared Fureman
*Assistant Examiner* — Duc M Pham
(74) *Attorney, Agent, or Firm* — Phillips Winchester; Justin K. Flanagan

(57) ABSTRACT

System and methods are described herein for providing wireless power to a target device, such as a laptop computer, a mobile phone, a vehicle, robot, or an unmanned aerial vehicle or system (UAV) or (UAS). A tunable multi-element transmitter may transmit electromagnetic radiation (EMR) to the target device using any of a wide variety of frequency bands. A location determination subsystem and/or range determination subsystem may determine a relative location, orientation, and/or rotation of the target device. For a target device within a distance range for which a smallest achievable waist of the Gaussian beam of the EMR at an operational frequency is smaller than the multi-element EMR receiver of the target device, a non-Gaussian beamform may
(Continued)

be determined to increase efficiency, decrease overheating, reduce spillover, increase total power output of rectenna receivers on the target device, or achieve another target power delivery goal.

31 Claims, 29 Drawing Sheets

(51) Int. Cl.
| | |
|---|---|
| *H04W 52/28* | (2009.01) |
| *H02J 50/27* | (2016.01) |
| *H02J 50/90* | (2016.01) |
| *H02J 50/80* | (2016.01) |
| *H01Q 3/24* | (2006.01) |
| *B64C 39/02* | (2006.01) |
| *H01Q 1/24* | (2006.01) |
| *H01Q 1/28* | (2006.01) |
| *H01Q 15/00* | (2006.01) |
| *H01Q 5/335* | (2015.01) |

(52) U.S. Cl.
CPC ............ *H01Q 3/247* (2013.01); *H01Q 5/335* (2015.01); *H01Q 15/0086* (2013.01); *H02J 50/23* (2016.02); *H02J 50/27* (2016.02); *H02J 50/80* (2016.02); *H02J 50/90* (2016.02); *H04W 52/283* (2013.01); *B64C 2201/042* (2013.01); *B64C 2201/066* (2013.01)

(58) Field of Classification Search
CPC ......... H01Q 3/247; H01Q 5/335; H02J 50/40; H02J 50/27; H02J 50/005; H02J 50/23; H02J 50/90; H04W 52/283
See application file for complete search history.

(56) References Cited

U.S. PATENT DOCUMENTS

| | | |
|---|---|---|
| 5,762,102 A | 6/1998 | Rimboym |
| 9,013,068 B2 | 4/2015 | Young |
| 10,622,845 B2 | 4/2020 | Arnitz et al. |
| 2008/0129598 A1 | 6/2008 | Godefroy et al. |
| 2012/0274154 A1 | 11/2012 | DeLuca |
| 2015/0091706 A1 | 4/2015 | Chemishkian et al. |
| 2015/0229133 A1 | 8/2015 | Reynolds et al. |
| 2016/0097851 A1* | 4/2016 | Zhang .................... B60L 53/80 342/22 |
| 2017/0212210 A1 | 7/2017 | Chen et al. |
| 2017/0285627 A1* | 10/2017 | Feldmann ............. H04W 4/025 |
| 2018/0103197 A1* | 4/2018 | Campbell ............. H04W 4/023 |
| 2018/0198320 A1* | 7/2018 | Criswell ................ H01Q 15/12 |
| 2018/0373270 A1* | 12/2018 | Lopez .................. G08G 5/0034 |

FOREIGN PATENT DOCUMENTS

| | | |
|---|---|---|
| KR | 2017-0115272 A | 10/2017 |
| WO | 2019113161 A1 | 6/2019 |

OTHER PUBLICATIONS

Searete LLC, International Patent Application No. PCT/US2018/063991, Written Opinion and International Search Report dated Mar. 22, 2019, 10 pp.

Arnitz et al., U.S. Appl. No. 15/832,612, Non-Final Office Action dated Sep. 5, 2019, 11 pp.

* cited by examiner

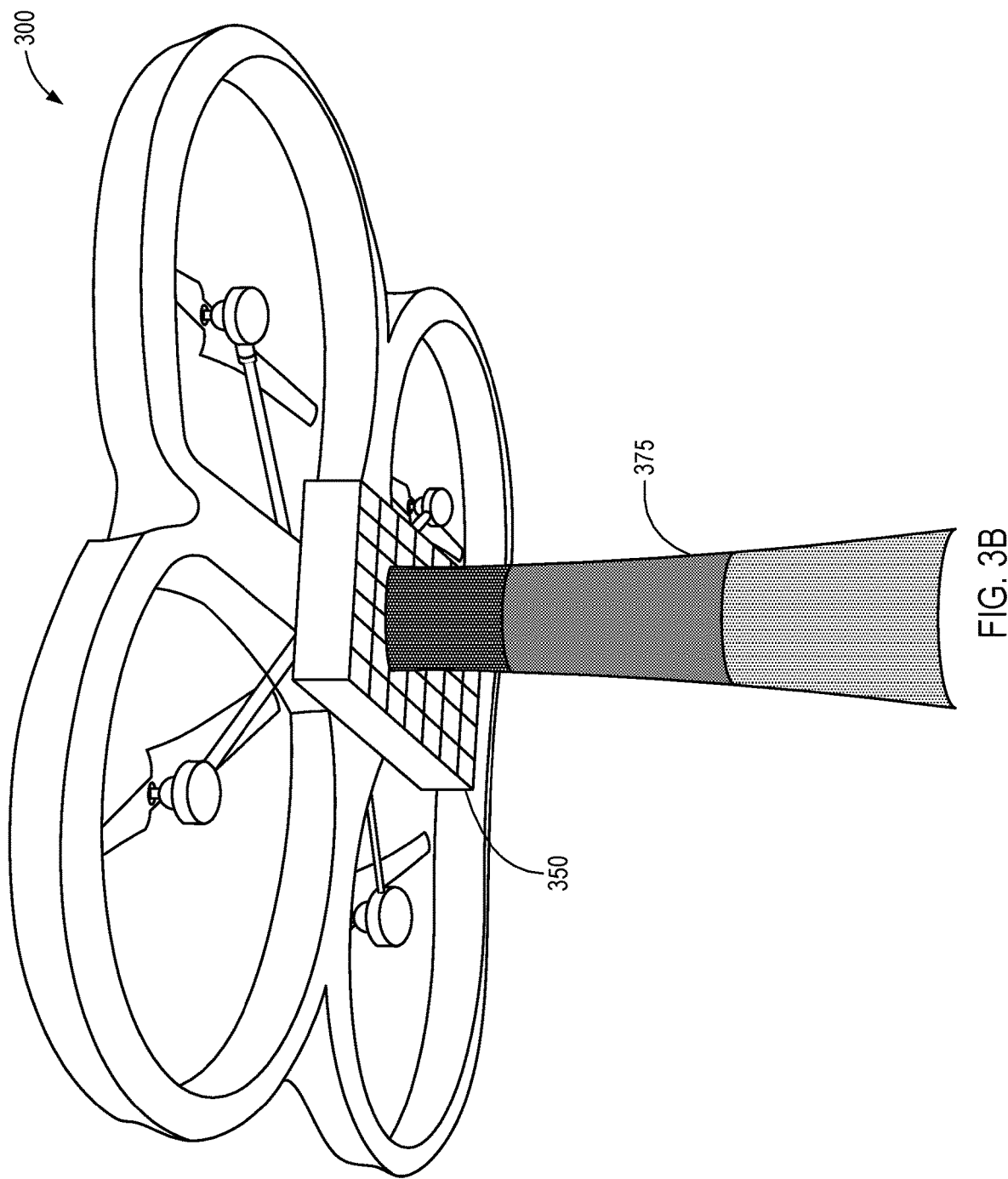

NON-GAUSSIAN BEAMFORMING FOR WIRELESS POWER TRANSFER OPTIMIZATION

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

This application is a continuation of and claims priority to U.S. patent application Ser. No. 15/832,612 filed on Dec. 5, 2017, titled "Non-Gaussian Beamforming for Wireless Power Transfer Optimization," which application is hereby incorporated by reference in its entirety.

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to wireless power transfer. Specifically, this disclosure relates to wireless power transfer using non-Gaussian beamforming.

BRIEF DESCRIPTION OF THE DRAWINGS

FIG. 3B illustrates a close-up of the Gaussian beam with the minimum waist smaller than the EMR receiver on the UAV.

DETAILED DESCRIPTION

Figure 1A:
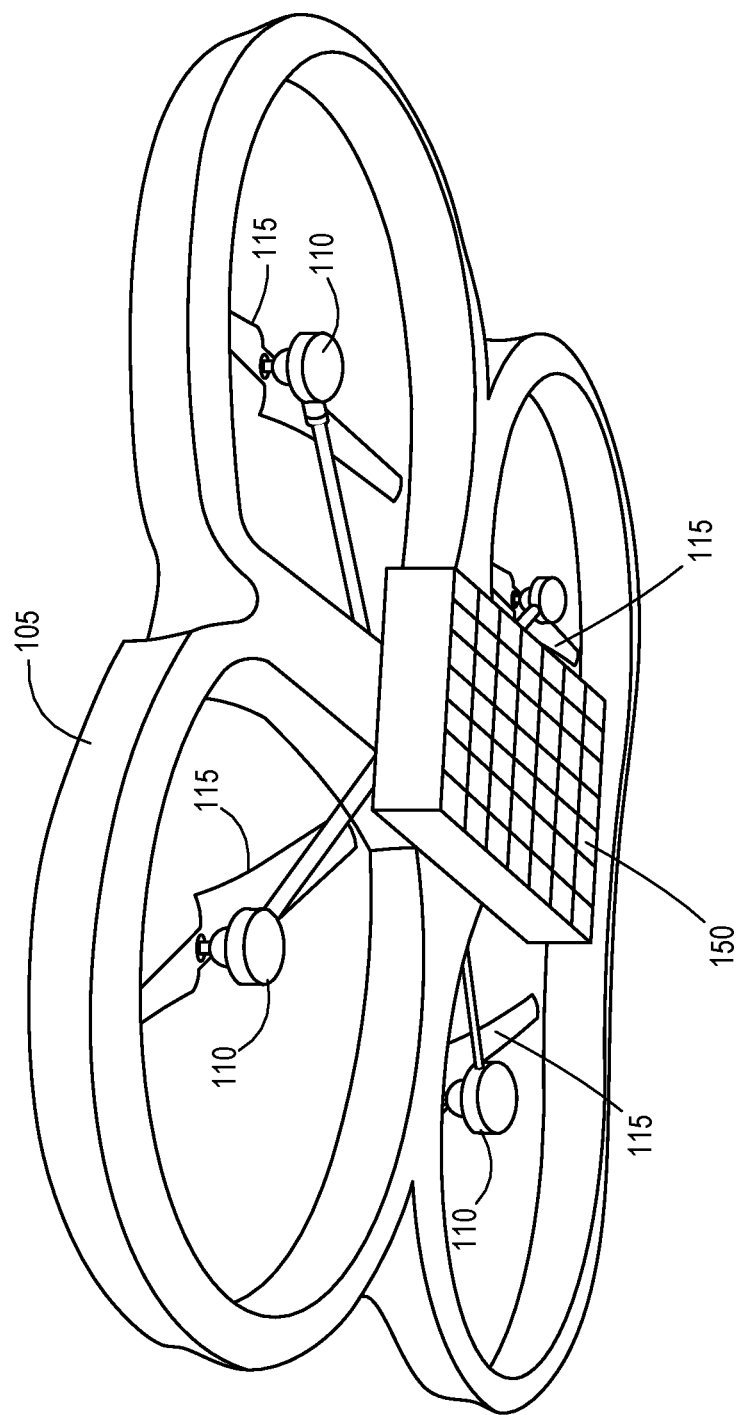
FIG. 1A illustrates an example of multi-element electromagnetic radiation (EMR) receiver on the underside of an unmanned aerial vehicle (UAV).

According to various embodiments of the systems and method described herein, a power transmitter provides wireless power to a receiver or a target device. A beamform calculator may determine a target beamform suitable for providing wireless power based on a relative location of the target device and the power transmitter. An updated or revised target beamform may be calculated based on movement of one or both of the target device and the power transmitter. That is, an optimized beamform may be calculated for each location of the target device relative to the power transmitter. Updated target beamforms may be calculated based on movement of the power transmitter and/or movement of the target device.

The power transmitter may receive an indication of a location of the target device and calculate a target beamform for wireless power transfer. As described below, the target beamform may be non-Gaussian based on the relative location and/or for optimization or attainment of one or more goals. The principles of this disclosure relate to wireless power transfer from a power transmitter to a receiver associated with any of a wide variety of target devices. Examples of target device include, but are not limited to, mobile phones, tablet computing devices, wearable tech devices, watches, laptop computers, unmanned aerial vehicles (UAVs), robots, autonomous sensors, mobile battery storage devices, automobiles, busses, passenger and cargo trains, computer peripheral devices, and other mobile or stationary devices that consume electricity.

Other examples of target devices include autonomous vehicles, mobile sensor arrays or sensor platforms, stationary sensor arrays or platforms, and the like. In one embodiment, a target device comprises a wireless base station configured to provide wireless communication access to various devices (e.g., Wi-Fi or LTE signals to mobile devices). The wireless base station may be deployed and powered via wireless power transfer from a power transmitter, as described herein.

Many of the examples described herein, including the illustrated embodiments, relate to wireless power transfer via a stationary or mobile power transmitter to a mobile UAV. Nevertheless, many of the principles described in the context of powering UAVs are equally applicable to wireless power transfer to any of a wide variety of target devices. Specifically, any of a wide variety of target devices may be configured with multi-element receiver configured to receive electromagnetic energy (EMR) from the power transmitter and convert received EMR into an electric current. Thus, descriptions of an EMR receiver in the context of a UAV can be uniformly applied to a wide variety of other target devices, unless the context explicitly requires otherwise. In many embodiments, a single-element receiver configured to receive electromagnetic energy (EMR) from a power transmitter may be used instead of a multi-element receiver. Thus, the term EMR receiver, unless context explicitly requires otherwise, encompasses both single-element and multi-element receivers that are configured to receive electromagnetic energy (EMR) from the power transmitter and convert received EMR into an electric current.

Using a UAV as an example of a mobile target device, a power transmitter may provide wireless power to one or more receivers on one or more UAVs, also known as unmanned aerial systems (UASs). In various embodiments, a location determination subsystem may determine a location of the UAV relative to a transmitter. Location data used to calculate, determine or otherwise identify the relative location of the UAV may be collected by the power transmitter itself, send by the UAV, and/or collected by a third electronic device. A beamform calculator may determine a target beamform based at least in part on the relative location of the UAV. In some instances, the transmitter may determine an electromagnetic radiation (EMR) pattern (i.e., a target beamform) that has a non-Gaussian field distribution. The power transmitter may transmit the EMR with the target beamform to one or more multi-element EMR receivers connected to or otherwise associated with the UAV.

In some embodiments, an EMR receiver is connected to the UAV, or another target device, during the manufacturing or construction process. In other embodiments, an EMR receiver may be connected to an existing UAV, or another target device, as a retrofit. An EMR receiver is configured to convert at least a portion of received EMR into an electric current. The electric current can then be used to power batteries, capacitors, motors, processors, and/or other electrically-driven components. An EMR receiver may include multiple sub EMR receivers that function independently and/or are electrically connected via a combiner, common power storage device, and/or other electrical components.

In some embodiments, a power transmitter may be configured to function based on the type, size, style, and/or another characteristic of the EMR receiver(s) on the UAV. For example, an EMR receiver on a UAV may be rated for a maximum power load and/or temperature. Similarly, a UAV may be configured with one or more EMR receivers arranged in a particular shape and/or have specific dimensions.

In some embodiments, the transmitter may be manually programmed by a user based on the particular EMR receiver(s) used by a UAV. In other embodiments, the EMR transmitter system may be configured to receive or request (e.g., via a receiver identification module) information identifying one or more characteristics of one or more EMR receivers of the UAV.

A location determination system may acquire or receive location data to determine the relative location of the UAV. In one embodiment, a camera (infrared, optical, UV, etc.) may be used to track the location of the UAV. One or more images (including video images or sequences of still images) captured by a UAV may be used to determine a relative location of the UAV. For example, an image captured by a UAV that includes the transmission system may provide sufficient data to estimate the relative locations of the UAV and the transmitter. In some embodiments, laser range finders, radar system, and/or LIDAR systems may provide location data that can be used to identify the relative location of the UAV. Such systems may be positioned on the transmitter, positioned on the UAV, and/or configured as part of a third device in communication with at least one of the power transmitter and the UAV.

In some embodiments, location data may be encapsulated or transmitted using the same communication channel used to receive a video feed from the target device (e.g., a UAV). In some embodiments, a power transmitter may send a query signal to the target device and one or more reflectors, transponders, and/or transceivers may provide a response signal with location data from the target device back to the transmitter or associated third device. For example, the power transmitter may receive a signal reflected from a UAV that has been modulated by the UAV. In some embodiments, the target device and/or the power transmitter may utilize location data obtained from a global positioning satellite system.

The power transmitter or associated third device, such as a cloud computing system, may utilize the location information to determine (e.g., calculate, look-up, estimate, or otherwise identify) the location and/or orientation of the receiver of the target device relative to the transmitter. The target device may provide the location data within the coherence bandwidth of the EMR transmitted by the power transmitter to the target device.

A receiver, such as a multi-element EMR receiver, of a UAV may include one or more transponders, reflectors, receiver, transceivers, and/or transmitters that are dedicated to or additionally configured to send location data from the UAV to the power transmitter. Transponders, reflectors, receivers, transceivers, transmitters, etc. that are used for sending or returning location data to the power transmitter may be positioned proximate a perimeter of the UAV or at corners of the UAV to aid in the determination of the orientation of the UAV relative to the power transmitter. Various techniques and approaches may be used by the UAV and/or the power transmitter to determine the relative location (optionally including orientation information). Examples of such techniques include, but are not limited to, relative time-of-flight measurements, phase offset measurements, code phase shift measurements, code phase delay measurements, frequency-offset measurements, angle-of-arrival measurements, triangulation calculations, and the like.

In various embodiments, the location data may be directly measured and/or indirectly measured by the power transmitter and/or distinct location determination devices. Indirect measurement and determination of the relative location of a UAV may be performed based on phase differences in received signals, delay differences in received signals, using nonlinear multiple-input-multiple-output (MIMO) techniques, nonlinear time-reversal beamform calculation techniques, and the like.

Using a calculated relative location (which includes orientation information in some embodiments), the power transmitter may calculate or otherwise determine a target beamform. The target beamform may be Gaussian if the UAV is beyond a distance at which the smallest possible waist of the beam is larger than the UAV. However, when the UAV is closer to the power transmitter, a Gaussian beam may not be chosen. A range determination subsystem may determine whether the UAV is beyond a threshold distance at which a smallest achievable waist (for a given frequency being utilized) is larger than a multi-element receiver of the UAV. A range determination subsystem and a location determine subsystem may be components that share one or more resources for determining a relative location of the UAV and then determining if the UAV is within a first distance range at which a non-Gaussian beam is utilized or if the UAV is within a second distance range at which a Gaussian beam will have a minimum waist larger than the EMR receiver of the UAV.

For example, the power transmitter may select a non-Gaussian beam to increase efficiency, decrease power supplied to particular portions of the UAV and/or portions of the EMR receiver of the UAV. For example, a target beamform with a non-Gaussian field distribution may approximate a ring-shaped distribution of EMR incident on the receiver of the UAV. This may, for example, limit the amount of EMR incident at a center portion of the UAV where a camera is positioned. In various embodiments, the target beamform may be determined to provide incident EMR on an EMR receiver that approximates the shape of the EMR receiver. Matching the incident EMR to the shape of the EMR receiver may increase overall efficiency and/or uniformity of incident EMR at locations on the UAV that is able to convert the EMR into an electrical current.

The target beamform with the non-Gaussian field distribution may be selected to limit peak levels of incident power on one or more sensitive portions of the UAV. In various embodiments, the UAV may communicate the relative locations of the sensitive portions of the UAV to the power transmitter. The target beamform with the non-Gaussian field distribution may be selected based on a weighted function to accomplish one or more goals. For example, the target beamform may be determined based on a weight function to accomplish the goals of uniformly distributing EMR incident on the EMR receiver and simultaneously reducing spillover EMR on the edges of the receiver. It is appreciated that these two goals may conflict, thus a weighted approach may be utilized to achieve an application-specific outcome. Other goals may be achieved, maximized, minimized, and/or considered as part of a weighted function. Examples of such goals include, but are not limited to, uniform distribution of EMR on the UAV, uniform distribution of EMR on an EMR receiver of the UAV, reducing spillover on edges of the EMR receiver, maximizing the production of electric current by the EMR receiver, minimizing scattering, and/or maintaining any of the above within upper and/or lower threshold boundaries.

In some embodiments, the UAV may provide an indication of a power characteristic associated with the EMR receiver. In other embodiments, the power transmitter may measure capture the indication of the power characteristic (e.g., via a thermal camera). A power monitoring system associated with the power transmitter may monitor the power characteristic and adjust or determine the target beamform according. In some embodiments, the power characteristic may provide an indication of actual current produced by the EMR receiver, a temperature of the EMR receiver, a temperature of an energy storage device on the UAV (e.g., battery, capacitor, etc.), a temperature of another component of the UAV, a voltage produced by the EMR receiver, and/or the like.

Infrared sensors, cameras, resistive devices, current transformers, voltage transformers, and/or a wide variety of known sensor types may be used to measure (directly or indirectly) the power characteristic of the UAV and/or associated EMR receiver. A power level and/or shape of the target beamform may be modified based on the received or measured power characteristic.

In one particular embodiment, the target beamform may be continually adjusted to maximize the power (e.g., based on measured current and/or voltage) generated by the EMR receiver. For example, while theoretical models may indicate that a uniform distribution of incident EMR on the EMR receiver of a UAV will produce the most efficient or even the highest power output, the realities of manufacturing and/or degradation of receiver components over time may undermine the theoretical models. The target beamform may be calculated to maximize actual power output based on a measured power characteristic. Thus, if a portion of the EMR receiver no longer functions or inefficiently converts received EMR to electric current, the target beamform will modify its shape and/or power distribution to continually maximize (optionally within some thresholds to prevent damage) actual power conversion.

In some embodiments, the target beamform may be selected to prevent overcurrent conditions, overpower conditions, overvoltage conditions, overheating of one or more receiver components, etc. For example, the power receiver (or associated computational device) may receive power characteristic information that includes various temperature measurements and power outputs of the EMR receiver. A target beamform may be selected (e.g., calculated and/or continually modified) to maximize the power output of the EMR receiver without exceeding a temperature threshold. The target beamform may be further configured to prevent scattering or spillover beyond a threshold limit. In some embodiments, an EMR receiver may include multiple receiver elements, each of which as a maximum temperature rating, maximum conversion ability, and maximum EMR intensity rating. The target beamform may be tailored to not exceed rated capacities of the EMR receiver as a whole and/or the rated capacities of any individual EMR receiver element or component.

As noted above, the target beamform may be calculated using a processor in the power transmitter and/or via associated computing devices (such as cloud-computing devices). In other embodiments, a number of predetermined target beamforms (and transmitter settings to attain each) may be stored in a memory (e.g., a look-up-table) and retrieved for a given location of the UAV and/or desired field distribution.

The EMR receiver on the UAV may be part of the system for providing wireless power and/or may be an existing EMR receiver on the UAV. The EMR receiver may receive EMR from the EMR transmitter and convert the received EMR to an electric current. In many embodiments, the EMR receiver of the UAV may include a plurality of sub-receivers. The EMR receiver and/or each sub-receiver portion may be described as a multi-element receiver, or a multi-element receive aperture, that contains a plurality of harvester elements. Each harvester element may receive EMR from the EMR transmitter and convert the received EMR to electric current (e.g., via half-wave or full-wave rectification). Conversion of the EMR to electric current may be performed using a wide variety of techniques and circuit components. For example, a wide variety of antenna elements, transmission lines, resonant elements, capacitors, inductors, resistors, transistors, and the like may be utilized. Specific examples of suitable components for a rectenna include, but are not limited to, coiled wire inductors, Schottky diodes and varactor diodes.

The electric current from each harvester element may be directly used to power a particular motor, rotor, processor, or another electrical component. In some embodiments, a combiner circuit may be used to combine the output of two or more harvester elements into a single electric current.

The electric current produced by the EMR receiver may be directly used to power a processor of the UAV, motor(s) of the UAV, camera(s) of the UAV, sensor(s) of the UAV, and/or other electrical components of the UAV. In some embodiments, the electric current produced by the EMR may be additionally or alternatively used to charge one or more power storage device on the UAV, such as capacitors and/or batteries.

Components may be adapted based on the frequency used for EMR power transmission. For example, components for radio frequencies (RF) may be different than those used for optical or infrared frequencies. Examples of possible frequency bands include those in the industrial, scientific and medical (ISM) radio band, 5.8 GHz, 2.4 GHz, 24 GHz, optical frequencies, and infrared frequencies. It is appreciated that specific frequency bands may be more suitable for different power levels, desired minimum waists, for longer distances, for line-of-sight applications, etc. Moreover, it is appreciated that specific frequency bands may be utilized to comply with government regulations, to limit interference with other equipment, and/or to otherwise conform to the specifications of a particular application or use-case.

A wide variety of tunable multi-element transmitters may be used for the power transmitter. In some embodiments, a phased array antenna may be used for beamforming. In other embodiments, a tunable metasurface antenna may be used for the power transmitter. Elements of the tunable metasurface may be tuned via one or more inputs to achieve a specific target beamform. Similarly, a tunable metasurface may be used for the EMR receiver on the UAV. The metasurface antenna (used for the power transmitter and/or EMR receiver) may include a plurality of antenna elements that are spaced at subwavelength intervals relative to an operating frequency. A plurality of tunable impedance elements, tunable via control inputs, may be coupled to the plurality of antenna elements. Each unique permutation of impedance values may result in a unique beamform. Thus, a target beamform may be attained by adjusting or tuning the impedance values of the tunable metasurface of subwavelength tunable antenna elements.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific function.

It is also appreciated that two or more of the systems, subsystems, components, modules, etc. that are described herein may be combined as a single system, subsystem, module, or component. Moreover, many of the systems, subsystems, components, and modules may be duplicated or further divided into discrete systems, subsystems, components or modules to perform subtasks of those described herein. Any of the embodiments described herein may be combined with any combination of other embodiments described herein. Many of the embodiments of the systems and methods described herein that appear to be mutually exclusive may be used in combination as weighted functions of one another and/or in primary-backup configurations in which one embodiment is used primarily, and the other embodiment is available as a backup.

As used herein, a computing device, system, subsystem, module, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), programmable logic device (PLD), field-programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented using hardware, software, firmware, or a combination thereof.

The components of some of the disclosed embodiments are described and illustrated in the figures herein. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. As described above, descriptions and variations described in terms of transmitters are equally applicable to receivers, and vice versa.

FIG. 1A illustrates an example of a target device with a multi-element electromagnetic radiation (EMR) receiver for receiving wireless power. Specifically, FIG. 1A illustrates an unmanned aerial vehicle (UAV) 105 with a multi-element EMR receiver 150 on the underside of the UAV 105. The illustrated UAV 105 is a quadcopter with four discrete motors 110 and associated rotors 115. It is appreciated that any of a wide variety of UAVs may utilize the systems and methods described herein, including fixed-wing UAVs, helicopter UAVs, and n-copter devices with any number of discrete rotors, propellers, stabilizers, or other propulsion or lift devices.

In the illustrated embodiment, the EMR receiver 150 is rectangular, and the multi-element nature of the EMR receiver 150 is represented by the grid of square elements. It is appreciated that the EMR receiver 150 may be any shape, size, thickness, and may have elements that face in directions other than straight down. In some embodiments, the EMR receiver pivot and/or rotate to maximize a power characteristic, as described herein.

Figure 1C:
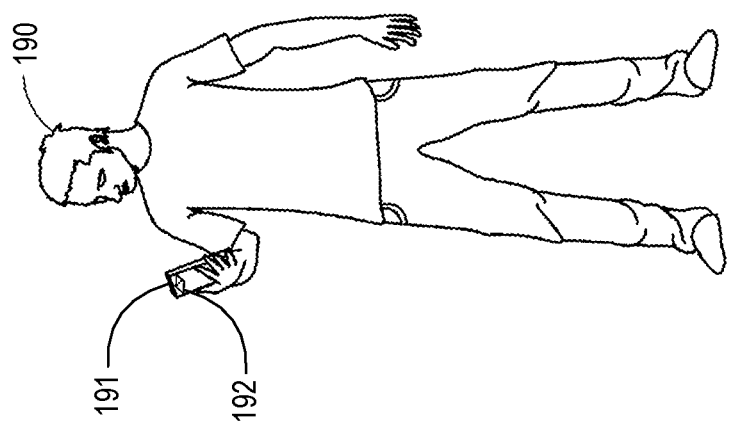
FIG. 1C illustrates an example of a mobile phone target device with an EMR receiver to facilitate wireless power transfer.
Figure 1B:
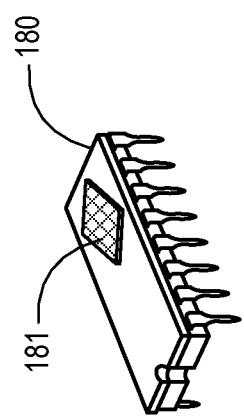
FIG. 1B illustrates an additional example of a target device that may be fitted or retrofitted with an EMR receiver to facilitate wireless power transfer.

FIG. 1B illustrates an additional example of a target device that may be fitted or retrofitted with an EMR receiver for receiving EMR and converting the received EMR into an electric current. Specifically, the illustrated example is a packaged computer chip 180 with a small EMR receiver 181 affixed thereto. The EMR receiver 181 may supply a DC electric current to the computer chip 180 by converting EMR received from an EMR transmitter according to any of various embodiments described herein.

FIG. 1C illustrates a user 190 of a mobile phone 191. The user 190 may retrofit a case of the mobile phone 191 with an EMR receiver 192 to receive wireless power. Alternatively, the EMR receiver 192 may be integrated within the mobile phone 191 by, for example, the manufacturer of the mobile phone 191 or manufacturer of the power supply of the mobile phone 191. As previously noted, any of a wide variety of target devices may be fitted, configured with, retrofitted with, or manufactured with integral EMR receivers to receive EMR from mobile and/or stationary power transmitters. Examples of target device include, but are not limited to, mobile phones, tablet computing devices, wearable tech devices, watches, laptop computers, unmanned aerial vehicles (UAVs), mobile battery storage devices, robots automobiles, busses, laptops, computer peripheral devices, and other mobile or stationary devices that consume electricity.

Figure 2A:
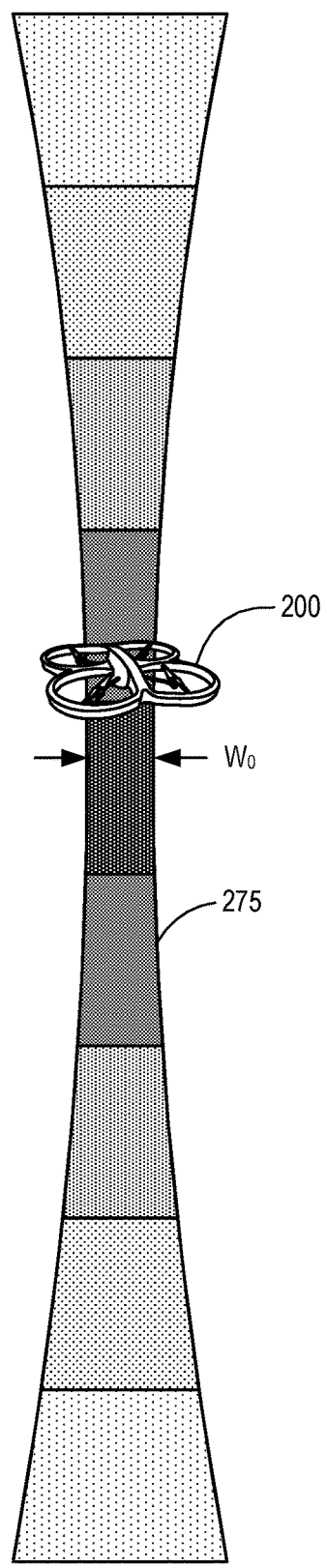
FIG. 2A illustrates an example of a Gaussian beam with a minimum waist that is larger than an EMR receiver on a UAV.

FIG. 2A illustrates an example of a Gaussian beam 275 with a minimum waist, coo, that is larger than an EMR receiver on a UAV 200. In such an embodiment, a location determination subsystem may determine a relative location of the UAV 200. A range determination subsystem may determine that the UAV 200 is at a distance at which the smallest achievable waist of a Gaussian beam at a given operational frequency is larger than the UAV or a receiver of the UAV. Accordingly, a beamform calculated may determine to use a target beamform with a Gaussian distribution to transmit EMR to the receiver of the UAV for conversion to an electric current.

Figure 2B:
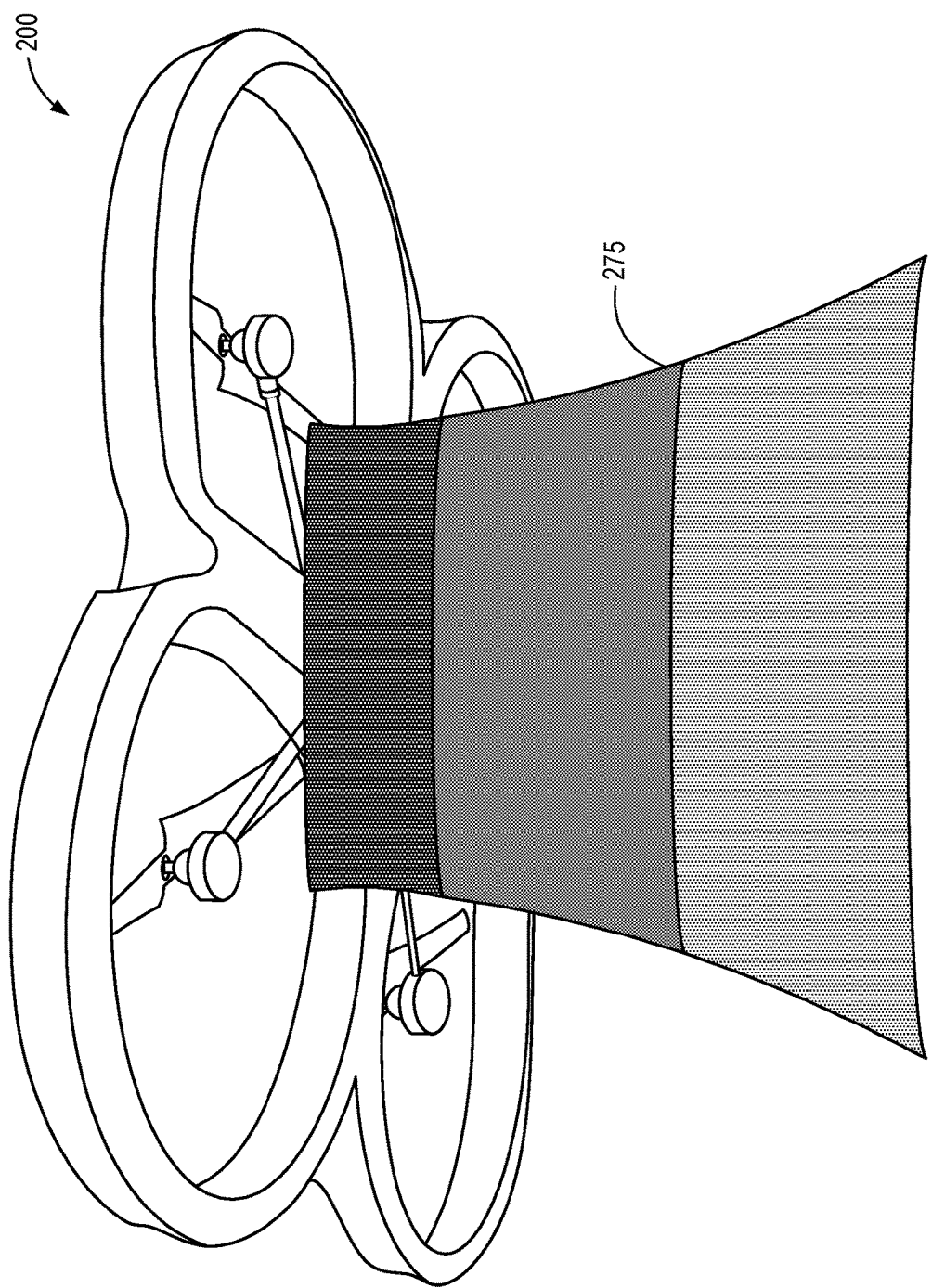
FIG. 2B illustrates a close-up of the Gaussian beam with the minimum waist larger than the EMR receiver on the UAV.

FIG. 2B illustrates a close-up of the Gaussian beam 275 with the minimum waist larger than the EMR receiver (obscured by the beam) on the UAV 200. Given that the UAV 200 is at a distance for which a more focused beam is not possible (for the given frequency band), a Gaussian beam may be utilized and/or an alternative frequency band may be utilized for which a smaller minimum waist is attainable.

Figure 3A:
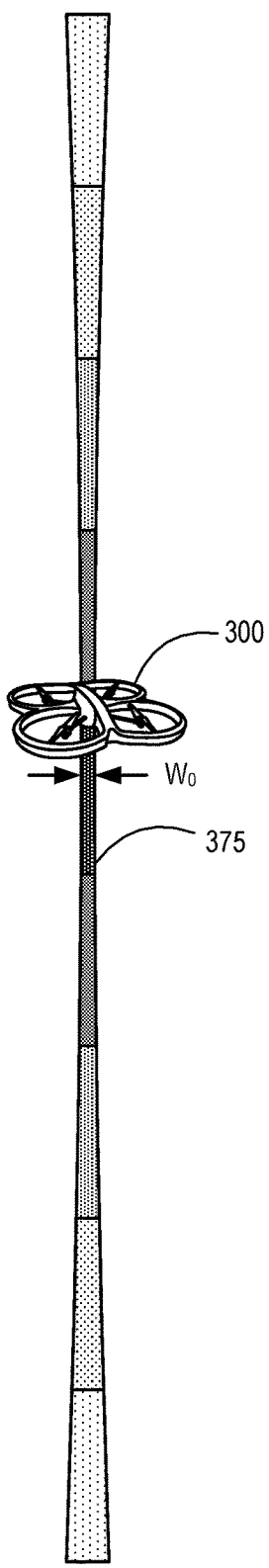
FIG. 3A illustrates an example of a Gaussian beam with a minimum waist that is smaller than an EMR receiver on a UAV.

FIG. 3A illustrates an example of a Gaussian beam 375 with a minimum waist, coo, that is smaller than an EMR receiver on a UAV 300. In such an embodiment, a location determination subsystem may determine the relative location of the UAV 300. A range determination subsystem may determine that, for a given power transfer frequency band, the UAV is at a distance at which the smallest achievable waist of the Gaussian beam is smaller or even much smaller than a multi-element receive aperture of the UAV. Accordingly, a beamform calculator may calculate a Gaussian distribution in some embodiments but may calculate target beamforms having non-Gaussian energy distributions according to any of the embodiments described herein and/or to achieve any of the goals described herein, or combinations thereof.

FIG. 3B illustrates a close-up of the Gaussian beam 375 with the minimum waist smaller than the EMR receiver 350 on the UAV 300.

Figure 3C:
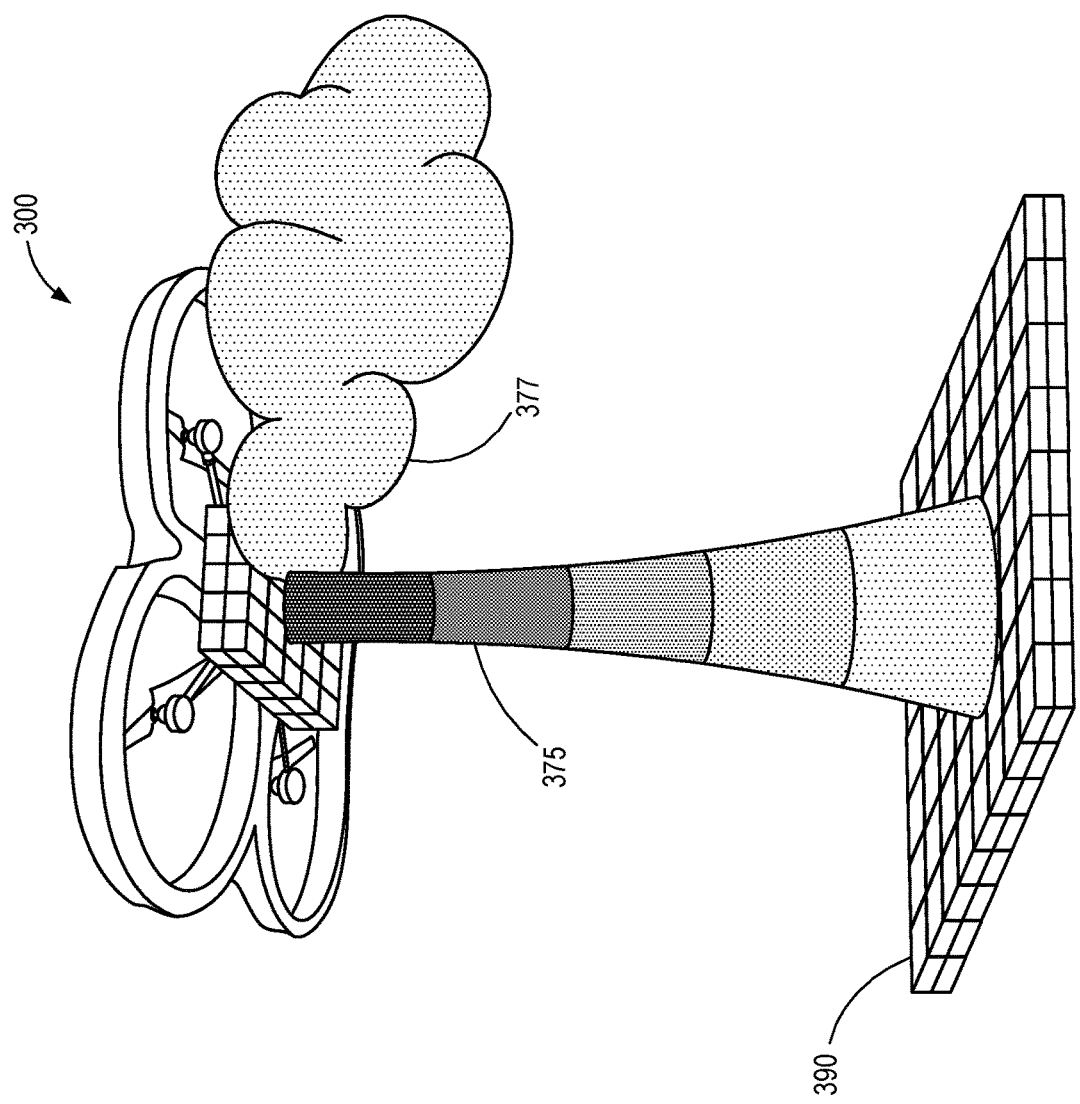
FIG. 3C illustrates a multi-element transmitter transmitting an overpowering Gaussian beam with a waist that is smaller than the EMR receiver of the UAV.

FIG. 3C illustrates a multi-element transmitter 390 transmitting an overpowering Gaussian beam 375 with a waist that is smaller than the receiver 375 of the UAV 300. The focused Gaussian beam 375 may overpower and even burn up (as illustrated by smoke 377) receive elements (e.g., harvester elements) in the center of the receiver 375. Such an outcome is likely undesirable unless destruction of the UAV 300 is the goal.

Figure 4A:
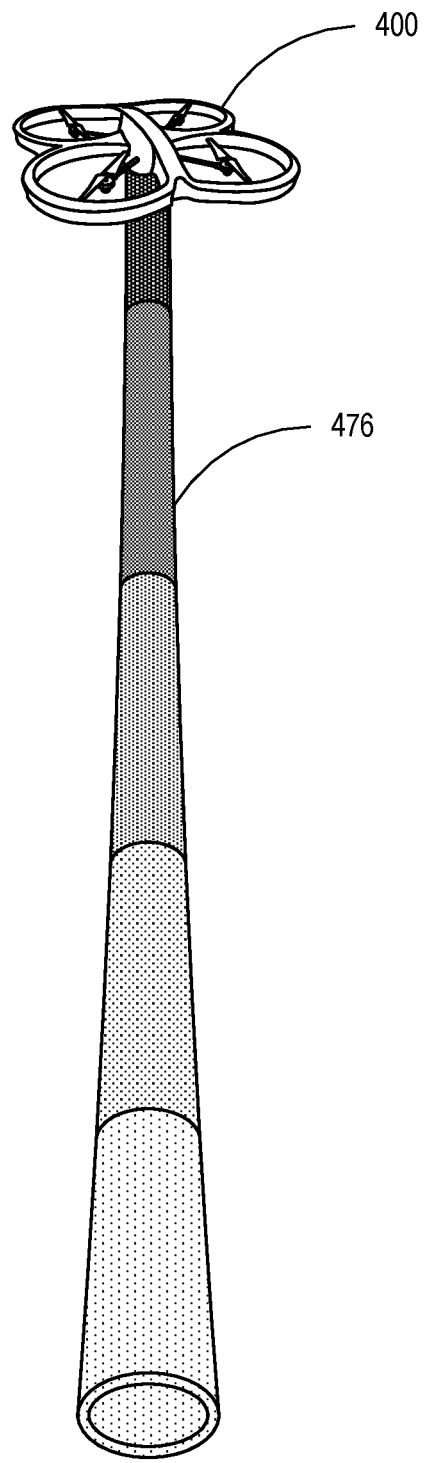
FIG. 4A illustrates an example of a non-Gaussian beam with a ring-shaped distribution of EMR transmitted to an EMR receiver on a UAV.

FIG. 4A illustrates an example of a non-Gaussian beam 476 with a ring-shaped distribution of EMR transmitted to an EMR receiver on a UAV 400. A ring-shaped distribution of EMR may be beneficial when, for example, the receiver of the UAV 400 is ring-shaped, portions on the outer edge of the receiver are cooled better than portions toward the middle of the receiver, and/or when other non-receiving equipment (e.g., processors, sensors, cameras, etc.) are located at the center of the UAV 400 with EMR receiver located around a perimeter or near the corners of the UAV 400.

Figure 4B:
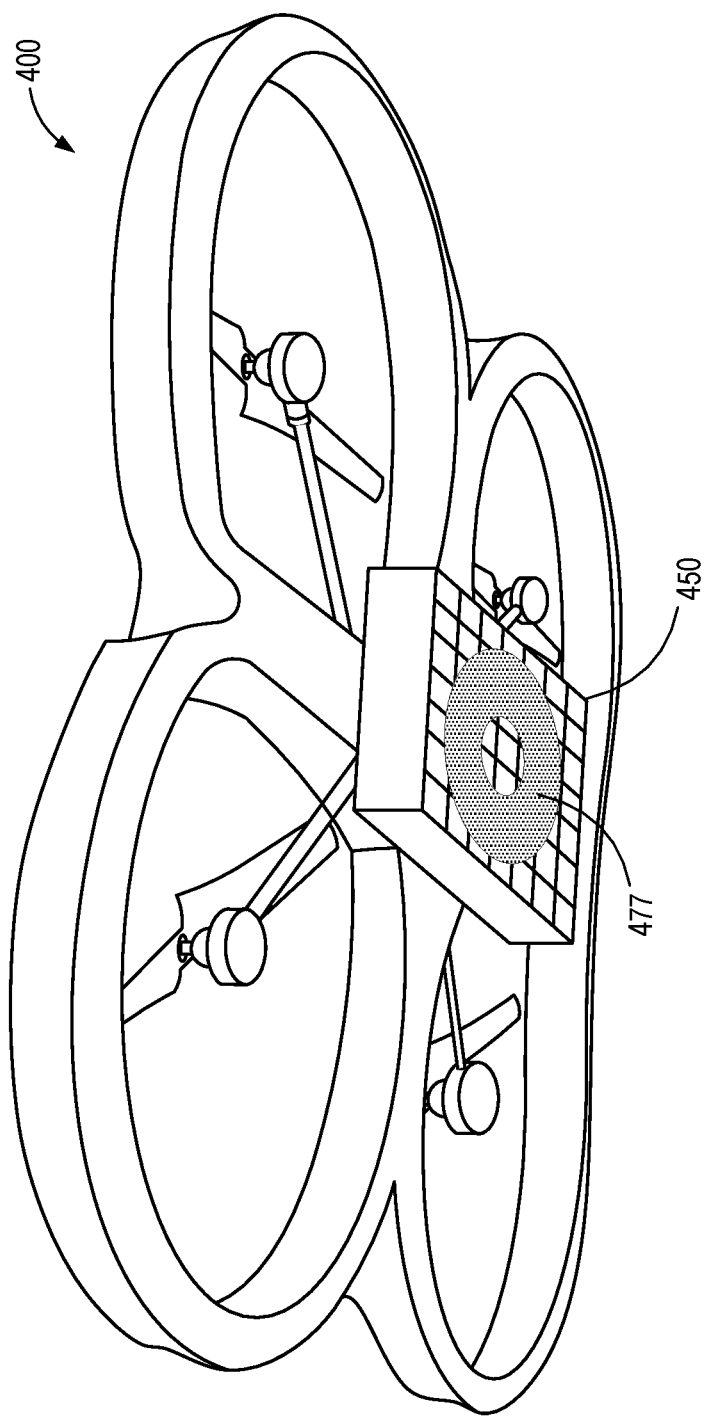
FIG. 4B illustrates a close-up of the non-Gaussian beamform incident on the multi-element EMR receiver in a ring shape.

FIG. 4B illustrates a close-up of the non-Gaussian beamform 477 incident on a multi-element EMR receiver 450 in a ring shape. In some embodiments, a ring-shaped distribution of incident EMR via the non-Gaussian beamform 477 may be desirable to limit overheating of a center of the receiver 450. In some embodiments, the distribution of incident power via the non-Gaussian beamform may not resemble any recognizable or normal shape. Rather, power characteristic information (e.g., temperature measurement data, current values, voltage values, etc.) may be used to calculate a distribution to achieve a specific goal.

For example, the conversion ability and/or efficiency of each of the receiver elements may differ based on manufacturing variances and/or degradation of equipment over time. In such an embodiment, the distribution of energy in the non-Gaussian beam may be iteratively or continuously modified to maximize (or minimize) one or more specific power characteristic. For instance, the distribution of energy in the non-Gaussian beam may be iteratively modified to maximize DC power output by the EMR receiver on the UAV. In another embodiment, the distribution of energy may be iteratively modified to maximize DC power output by the EMR receiver on the UAV without exceeding a threshold temperature value or maximum energy rating of the EMR receiver or its subcomponents.

Figure 5A:
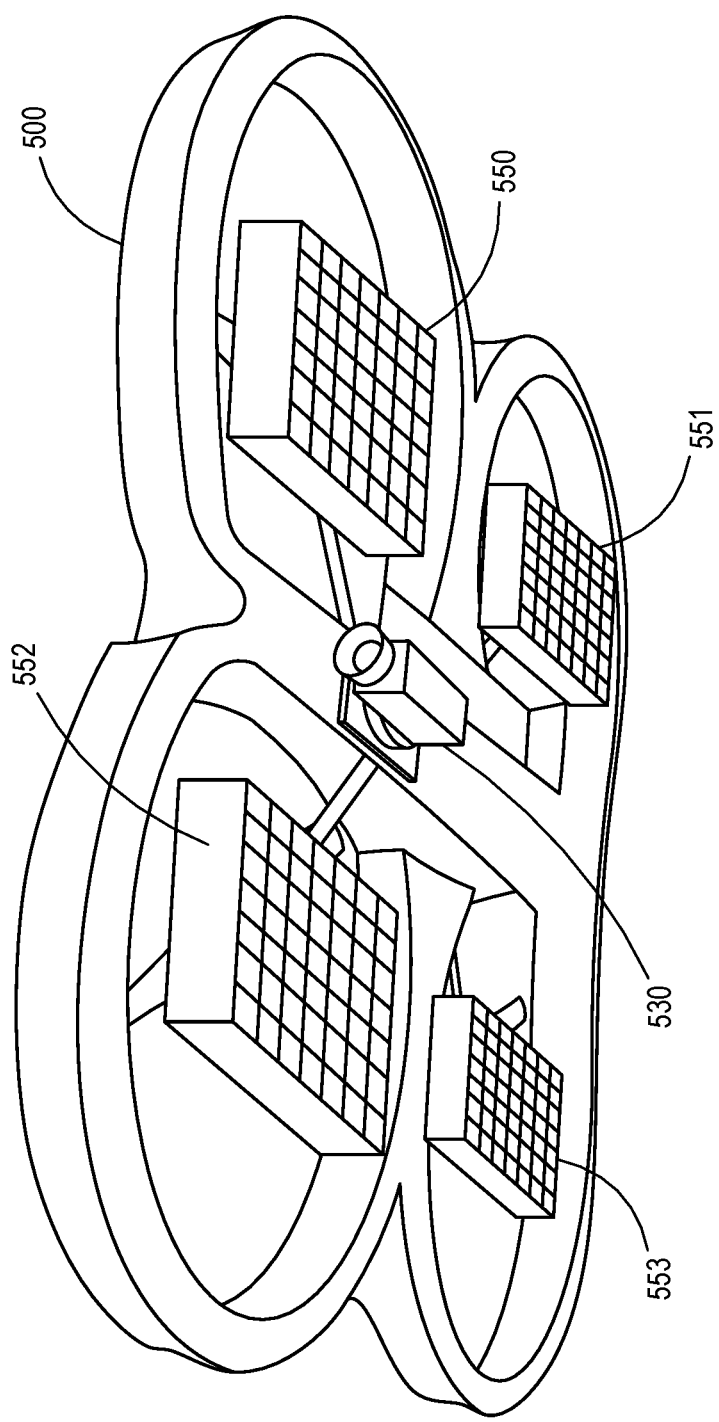
FIG. 5A illustrates an example of a multi-element EMR receiver with four distinct quadrants on the underside of a UAV.

FIG. 5A illustrates an example of a multi-element EMR receiver with four distinct sectors (quadrants) 550, 551, 552, and 553 on the underside of a UAV 500. In the illustrated embodiment, a camera 530 is positioned near a center of the UAV 530. Each of the receiver sectors 550, 551, 552, and 553 may be positioned directly beneath each rotor, offset from the center of each rotor, and/or a certain distance below each rotor. The receiver sectors 550, 551, 552, and 553 may be positioned and/or sized to benefit from cooling by the rotors of the UAV 500 without impeding the rotors ability to lift the UAV 500 at all or more than a threshold amount.

Figure 5B:
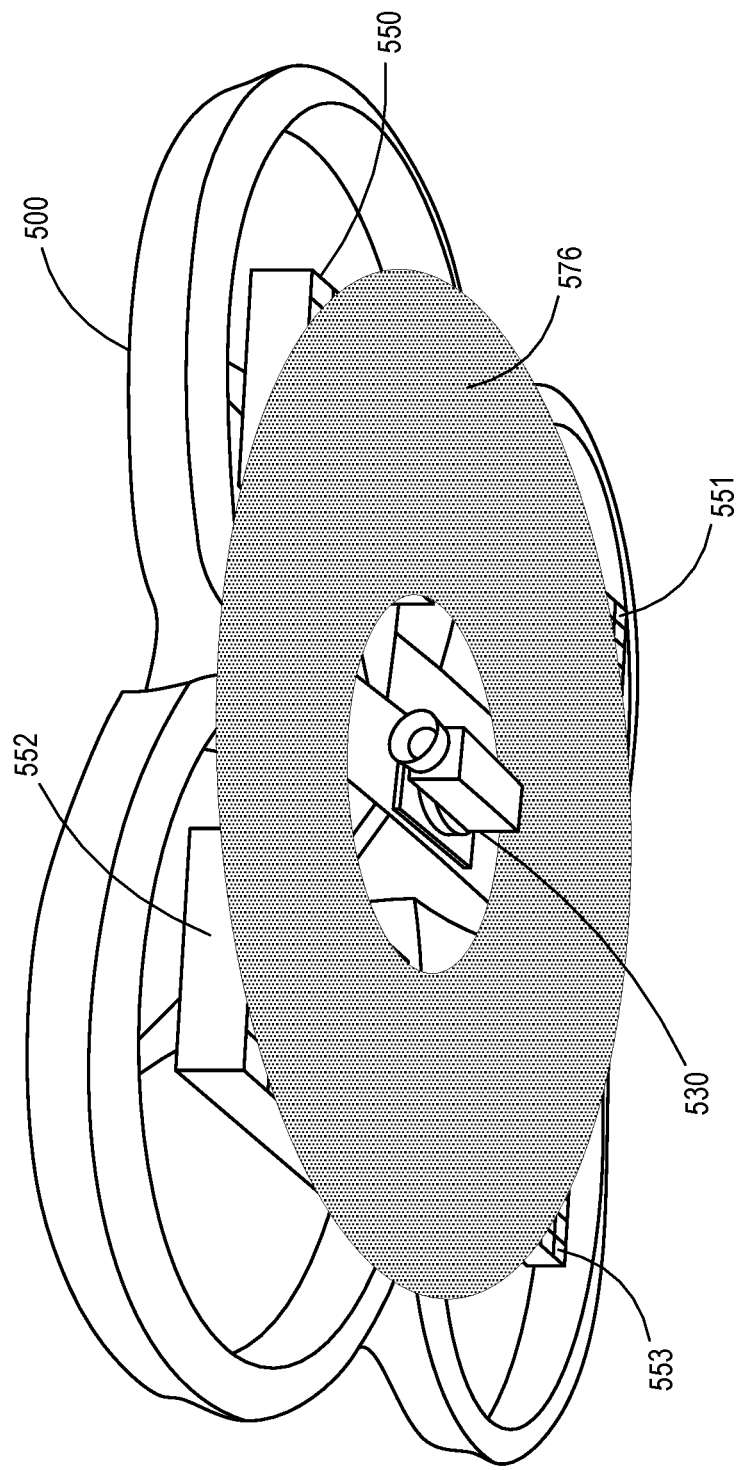
FIG. 5B illustrates a non-Gaussian beamform incident on the underside of the UAV.

FIG. 5B illustrates a non-Gaussian beamform 576 incident on the underside of the UAV 500. The non-Gaussian beamform 576 provides a relatively even distribution of energy to each of the receiver sectors 550, 551, 552, and 553, while reducing or even minimizing the amount of energy incident on the camera 530 and/or spilling around the edges of the UAV 500. To the contrary, a Gaussian beamform would likely include the highest energy density toward the center of the UAV 500 where the camera 530 is located. Thus, a Gaussian beamform may be less efficient and/or potentially interfere with the functionality of the camera 530 and/or other control circuitry within the center body of the UAV 500.

In some embodiments, each of the receiver sectors 550, 551, 552, or 553 is connected to the same power storage and/or via a common combiner circuit. In other embodiments, each receiver sector 550, 551, 552, and 553 is directly connected to a motor controlling one of the rotors of the UAV 500. In such an embodiment, the distribution of energy of the ring-shaped non-Gaussian beamform 576 may be modified to provide more (or less) power to one or more of the receiver sectors 550, 551, 552, or 553. The increase (or decrease) in power to the one or more receiver sectors 550, 551, 552, or 553 may be used to control the movement of the UAV 500. For instance, by increasing the power to all four receiver sectors 550, 551, 552, and 553, the UAV will rise in elevation. Conversely, decreasing power to all four receiver sectors 550, 551, 552, and 553, will cause the UAV to lower in elevation. By increasing (or decreasing) power to one or two of the receiver sectors 550, 551, 552, and 553, forward, backward, and lateral movement of the UAV can be controlled.

Figure 6A:
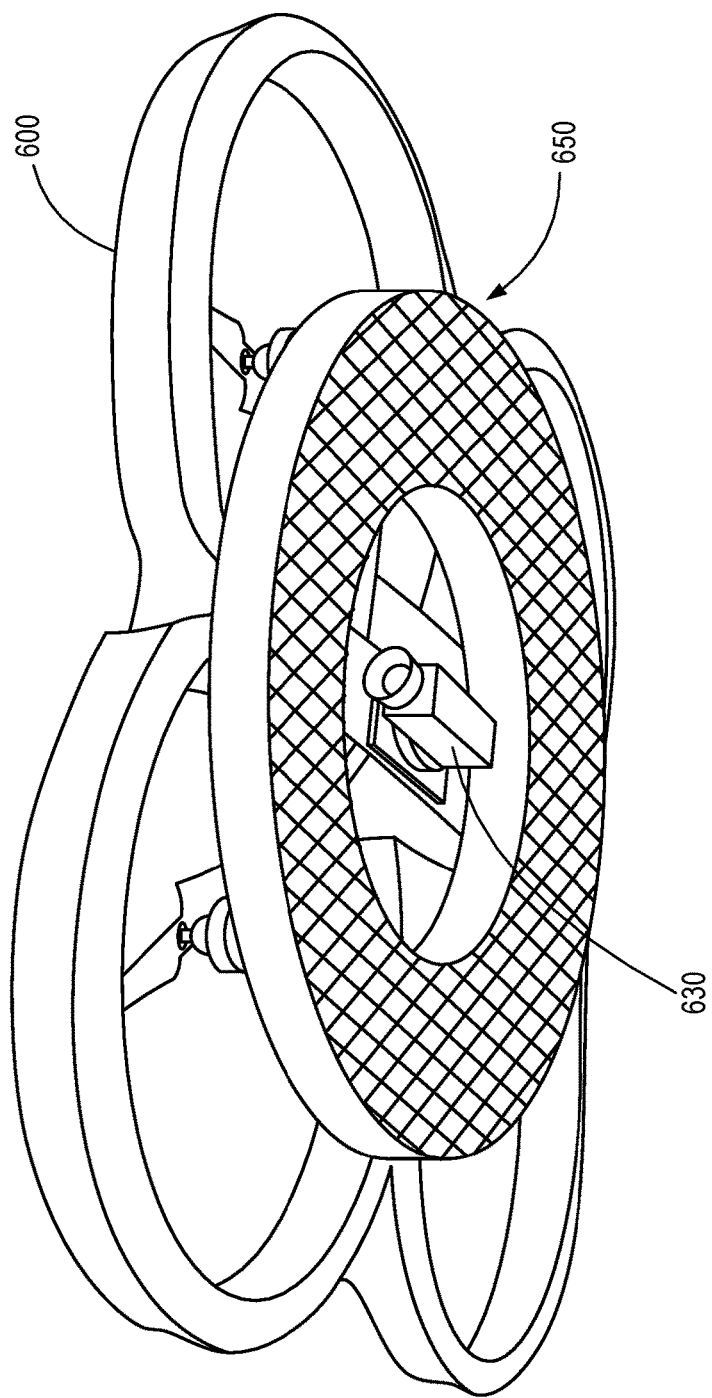
FIG. 6A illustrates another example of a multi-element EMR receiver.

FIG. 6A illustrates another example of a multi-element EMR receiver 650 on UAV 600. As illustrated, the multi-element EMR receiver may be shaped like a ring with a camera 630 and/or other sensors and control circuitry in the center of the ring-shaped multi-element EMR receiver 650.

Figure 6B:
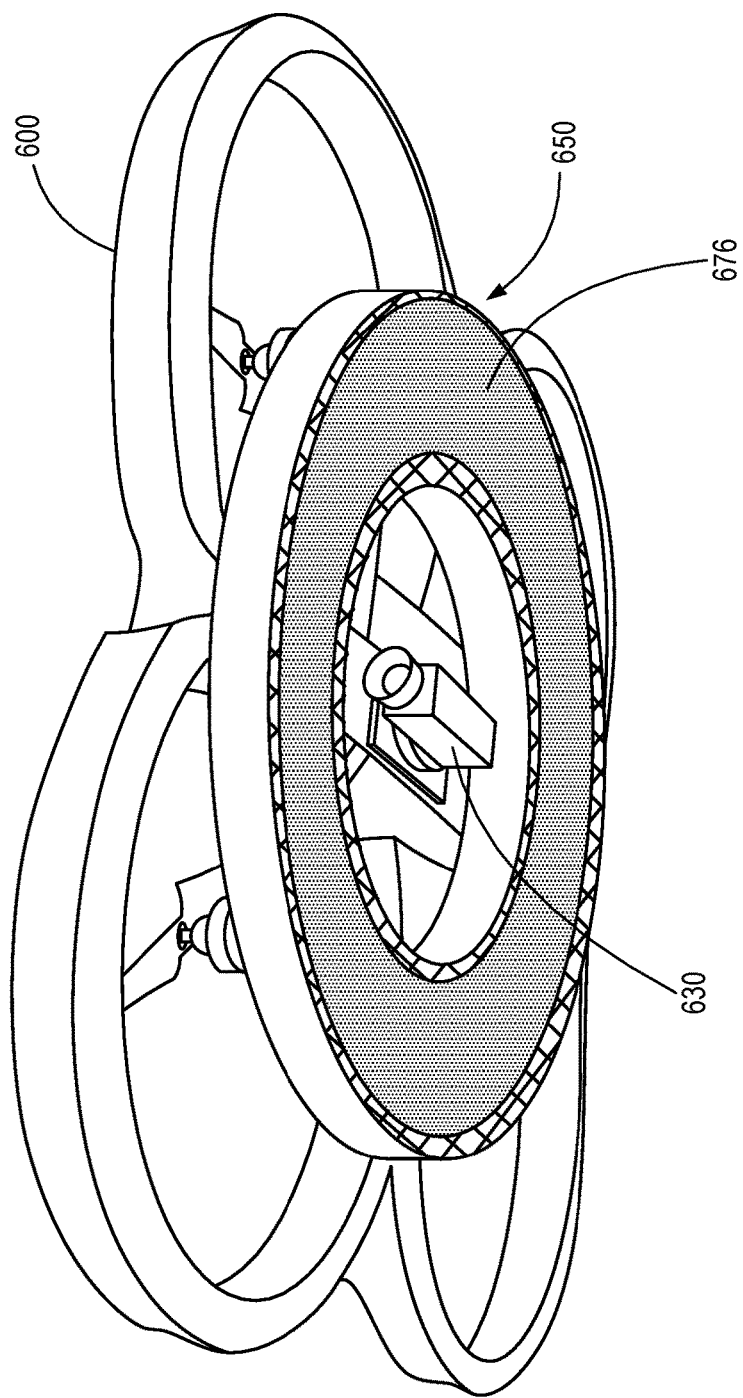
FIG. 6B illustrates a non-Gaussian beamform incident on the multi-element EMR receiver.

FIG. 6B illustrates a non-Gaussian beamform 676 incident on the ring-shaped multi-element EMR receiver 650. It is appreciated that matching the shape of the non-Gaussian beamform 676 to the receiver and/or arrangement of receivers on a UAV may, in some embodiments, improve overall efficiency and/or reduce spillover or interference with other electronic components.

Figure 6C:
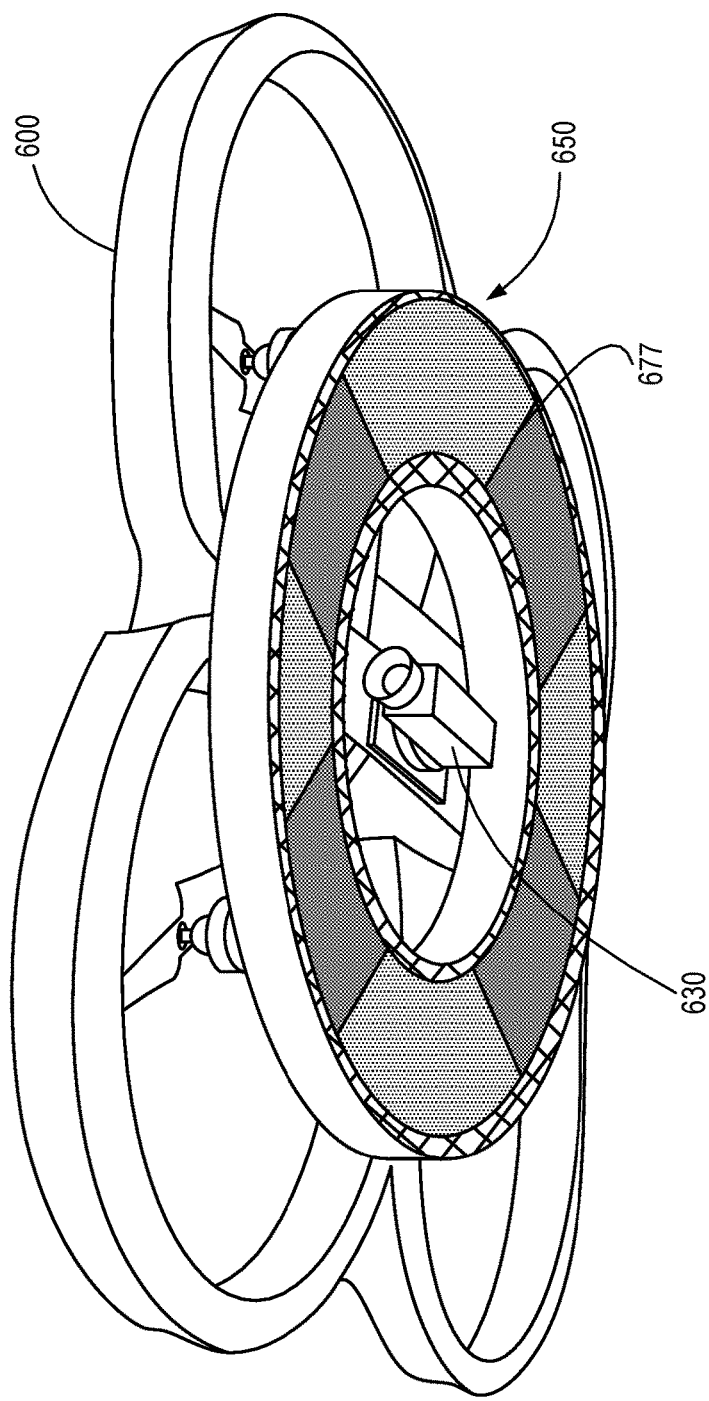
FIG. 6C illustrates an alternative non-Gaussian beamform incident on the multi-element EMR receiver.

FIG. 6C illustrates an alternative non-Gaussian beamform 677 incident on the ring-shaped multi-element EMR receiver 650. In the illustrated embodiment, the location information obtained by the power transmitter may include information identifying the orientation (including rotation) of the UAV 600. The transmitter may generate a non-Gaussian beamform 677 that has a higher energy density on portions of the ring-shaped multi-element EMR receiver 650 that are cooled by the rotors of the UAV. A lower energy density may be allocated to portions of the ring-shaped multi-element EMR receiver 650 that are not cooled (or less cooled) by the rotors.

In an alternative embodiment, the transmitter may utilize power characteristic information to generate the non-Gaussian beamform 677. For example, power characteristic information may provide information identifying the temperature at one or more locations on the ring-shaped multi-element EMR receiver 650, total current output, and/or other information. The transmitter may calculate or iteratively identify through a series of small changes to the beamform, a target beamform that results in a desired or target power output, temperature profile, and/or attains another goal as described herein.

Figure 7A:
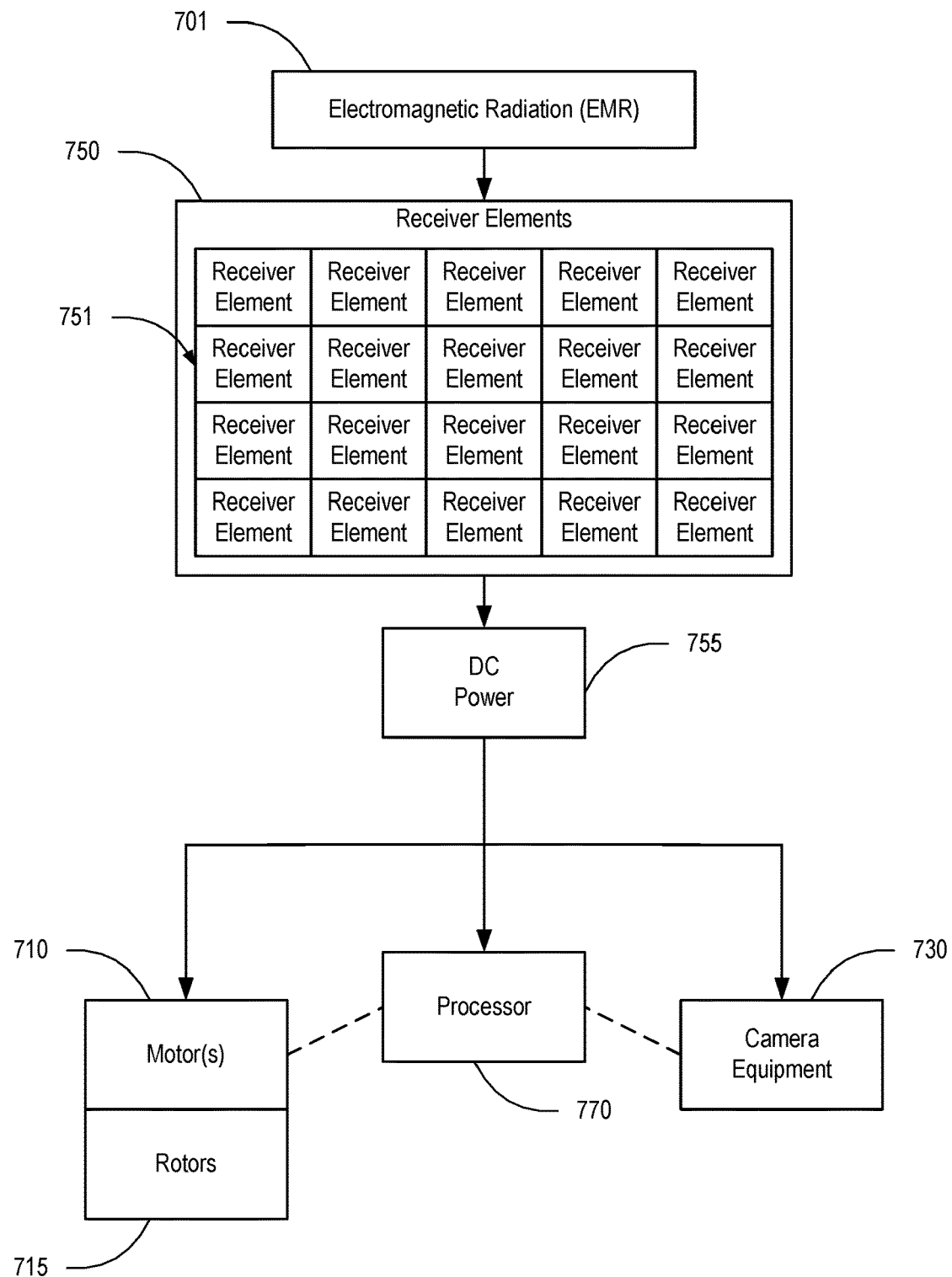
FIG. 7A illustrates a block diagram of one example of a wireless power flow for a UAV.

FIG. 7A illustrates a block diagram of one example of a wireless power flow for a UAV that includes a receiver 750 with a plurality of receiver elements 751 and a battery 760. As illustrated, the multi-element receiver 750 may convert incident EMR 701 into a DC power output 755. For example, multi-element receiver 750 may comprise a plurality of rectennas connected to a combiner circuit to produce a DC power output 755. The DC power 755 may be used to power motors 710 of rotors 715, processor(s) 770, and/or camera equipment 730.

It is appreciated that the block diagram of FIG. 7A may be adapted for any of a wide variety of alternative target devices in addition to UAVs. For example, the receiver 750 with the plurality of receiver elements 751 may be used to power a motor of a vehicle instead of rotors 715. Similarly, the processor(s) 770 may be associated with a mobile electronic device such as a mobile phone instead of a UAV.

Figure 7B:
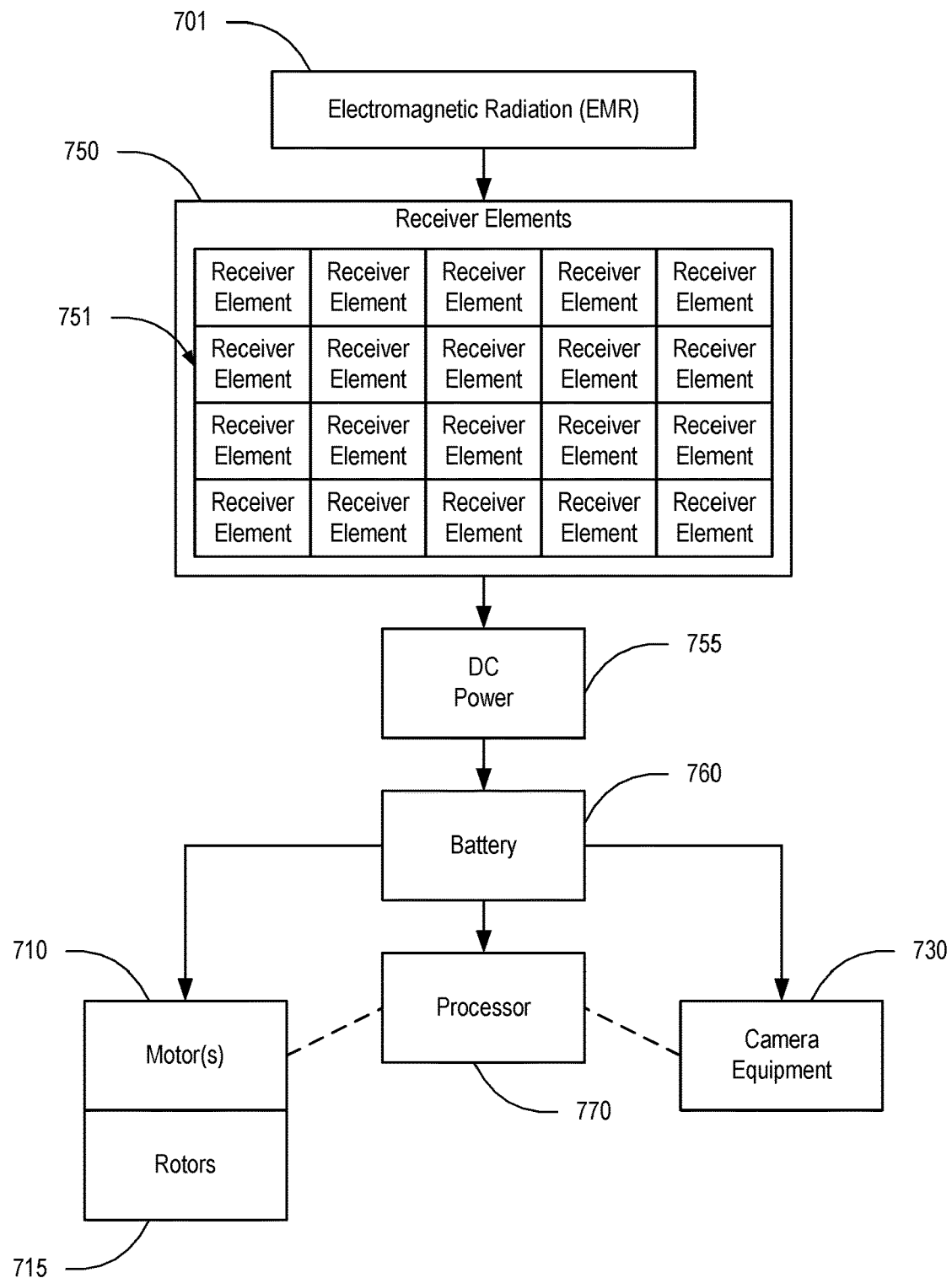
FIG. 7B illustrates a block diagram of an alternative example of a wireless power flow for a UAV that includes battery bank.

FIG. 7B illustrates an alternative block diagram of the wireless power flow in FIG. 7A that further includes a battery 760. In the illustrated embodiment, the DC power output 755 of the multi-element receiver 750 is used to charge a battery bank 760 that is used to power the various components of the UAV (e.g., the motors 710 of rotors 715, processor(s) 770, and/or camera equipment 730). Such an embodiment may allow for intermittent loss of wireless power availability without affecting the UAVs ability to operate.

Figure 7C:
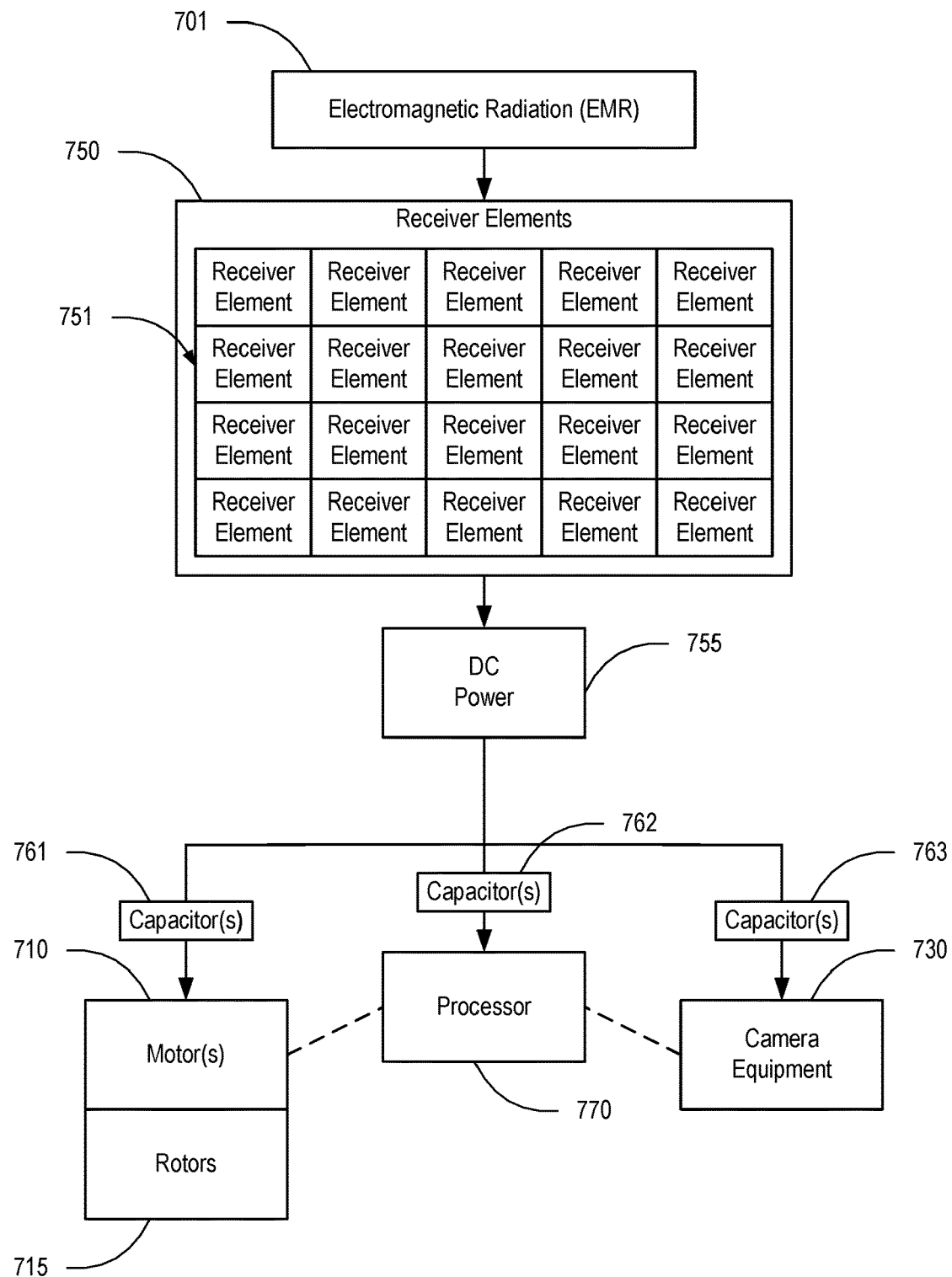
FIG. 7C illustrates a block diagram of an alternative example of a wireless power flow for a UAV that includes capacitors.

FIG. 7C illustrates an alternative block diagram of the wireless power flow in FIG. 7A that further includes capacitors 761, 762, and 763. Similar to the battery bank 760 in FIG. 7B, the capacitor may improve the operational reliability of the UAV in the event of wireless power disruptions. In some embodiments, capacitors in the rectenna design of the multi-element receiver 750 may obviate the need for capacitors 761, 762, and 763.

Figure 7D:
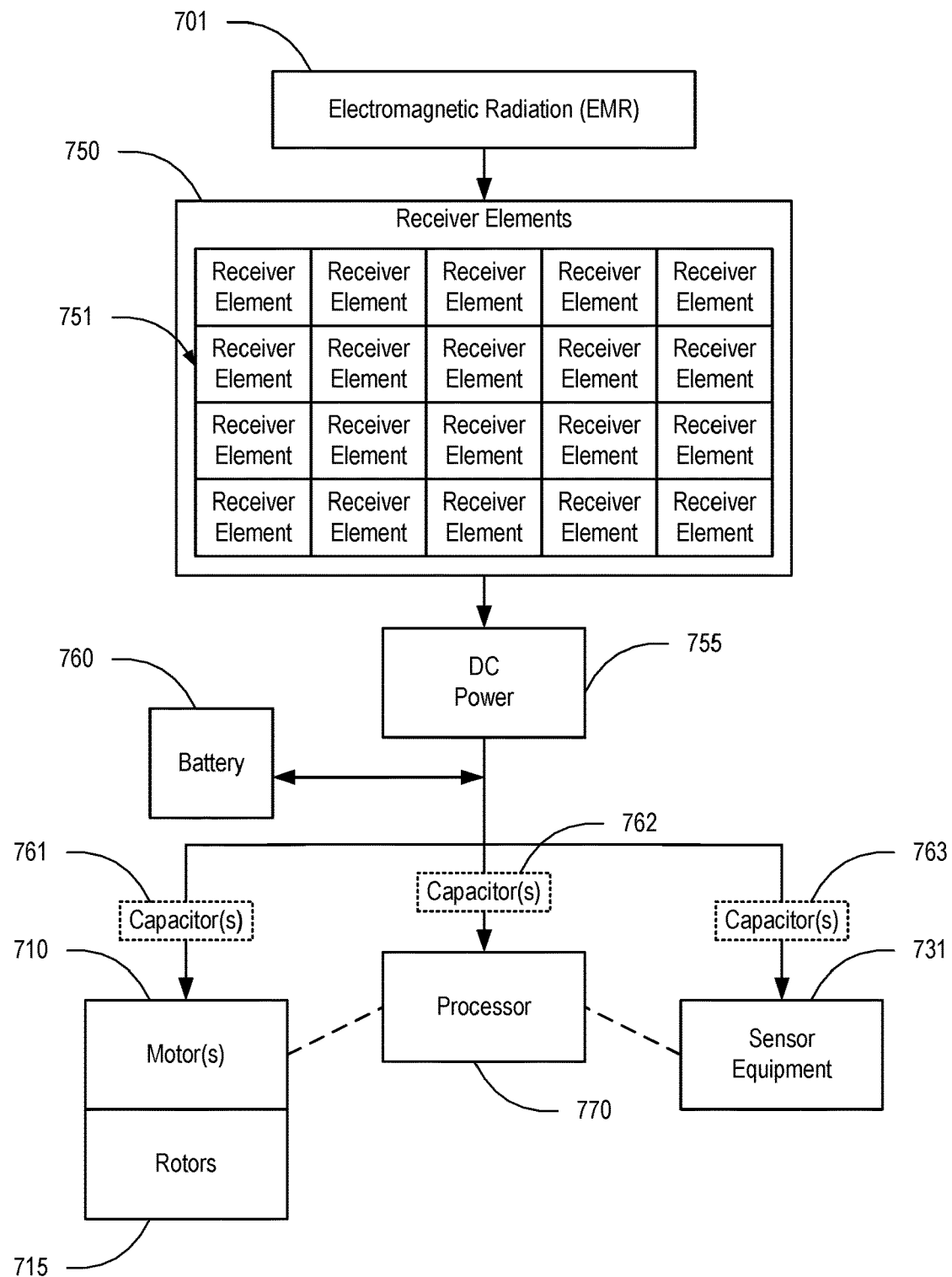
FIG. 7D illustrates a block diagram of an alternative example of a wireless power flow for a UAV that includes capacitors and a battery.

FIG. 7D illustrates an embodiment in which the DC power output 755 of the multi-element receiver 750 is used to directly drive load devices, such as motor(s) 710, processor 770, and/or sensor equipment 731 (e.g., a camera, IR sensor, LIDAR, ultrasonic sensor, etc.). Capacitors 761, 762, and 763 may be optionally included between the DC power output 755 and load devices. A battery 760 may be charged when the multi-element receiver 750 produces a DC power output 755 that exceeds the load demand. The battery 760 may also provide power to the load devices when the multi-element receiver 750 produces a DC power output 755 less than the load demand. In embodiments that include both battery 760 and capacitors 761, 762, and 763, short-term power fluctuations may be leveled by the capacitors 761, 762, and 763 and long-term power fluctuations may be handled by the battery 760.

Figure 8A:
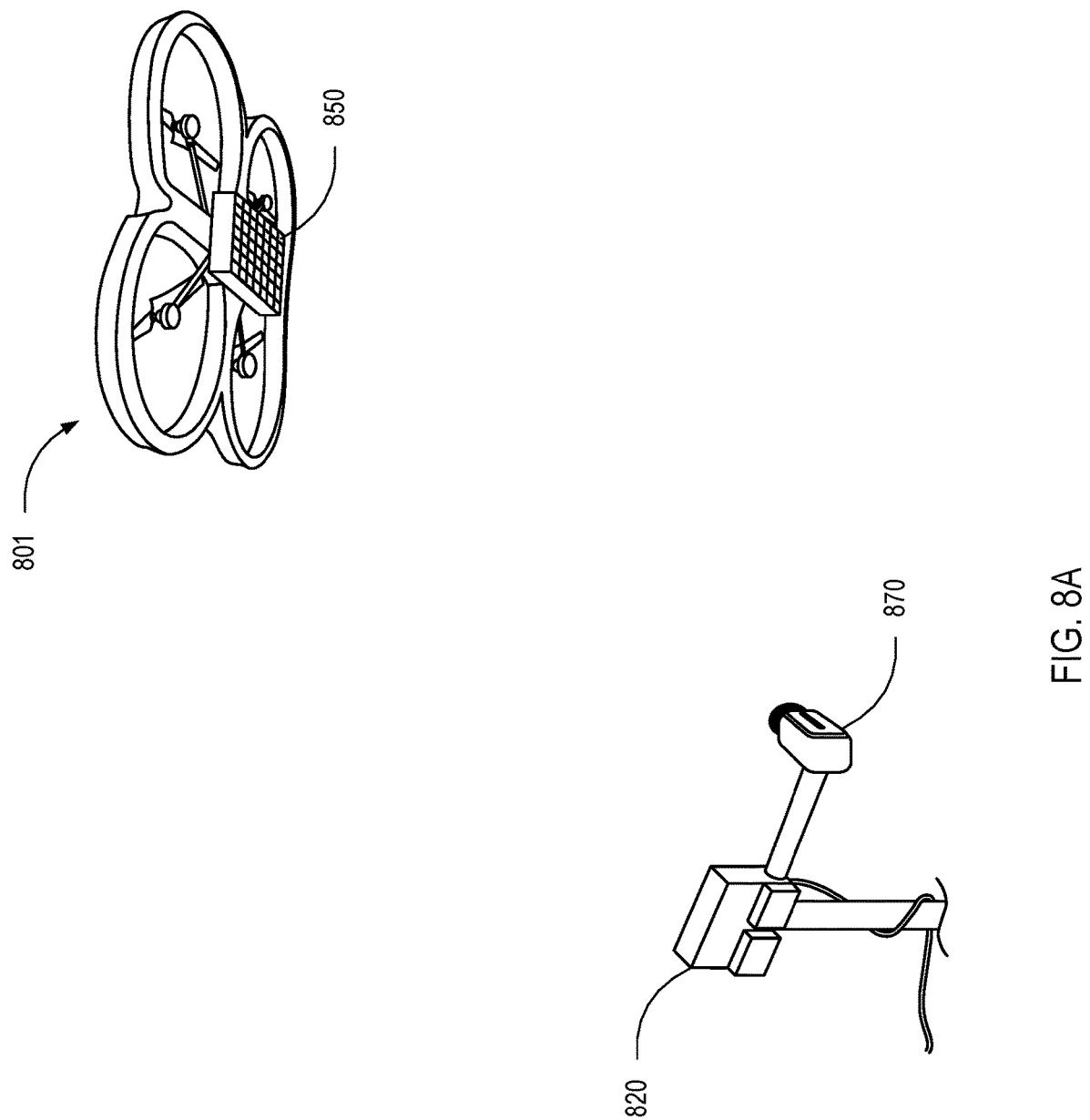
FIG. 8A illustrates a transmitter to selectively transmit a Gaussian or a non-Gaussian beam to provide power to a UAV with a multi-element EMR receiver.

FIG. 8A illustrates a transmitter 820 (i.e., a power transmitter) configured to selectively transmit a Gaussian or a non-Gaussian beam to provide power to a UAV 801 with a multi-element EMR receiver 850. The illustrated embodiment shows the transmitter 820 as a ground-based transmitter. In various alternative embodiments, transmitter 820 may be mounted on a vehicle, an aerial vehicle, and/or even hand-held in some applications. For small UAVs, the power consumption may be low enough that a handheld, battery-operated transmitter may be used to supply wireless power to the UAV 801. In some embodiments, a handheld, battery-operated device may be a combination unit for providing control signals to the UAV, receiving sensor information from the UAV (e.g., a video feed), and/or providing wireless power. In some embodiments, such a handheld device may include a display and/or various control functions and/or be configured to connect to a display and/or control device.

A location determination subsystem may include a sensor 870 to identify a relative location of the UAV 801. The sensor 870 may include a transmitter to transmit a signal that is reflected, refracted, modulated by the UAV back to a receiver of the sensor 870. In other embodiments, the sensor 870 may receive information from the UAV without sending a query or other signal to the UAV. For Example, the sensor 870 may be an optical camera configured to track the location of the UAV.

Figure 8B:
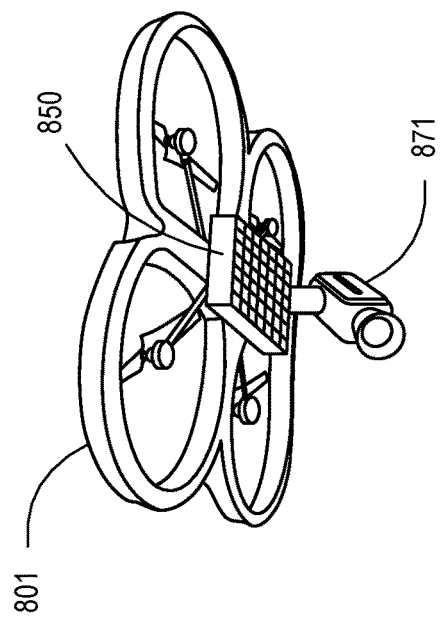
FIG. 8B illustrates a transmitter to provide power to a UAV with a multi-element EMR receiver and a transmitter-tracking sensor.
Figure 8B:
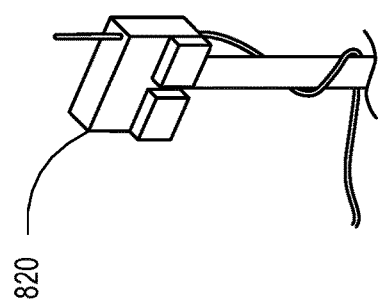

FIG. 8B illustrates another embodiment in which a transmitter 820 to provide power to a UAV 801 with a multi-element EMR receiver 850. As illustrated, the UAV may include a transmitter-tracking sensor 871, such as a camera.

Figure 8C:
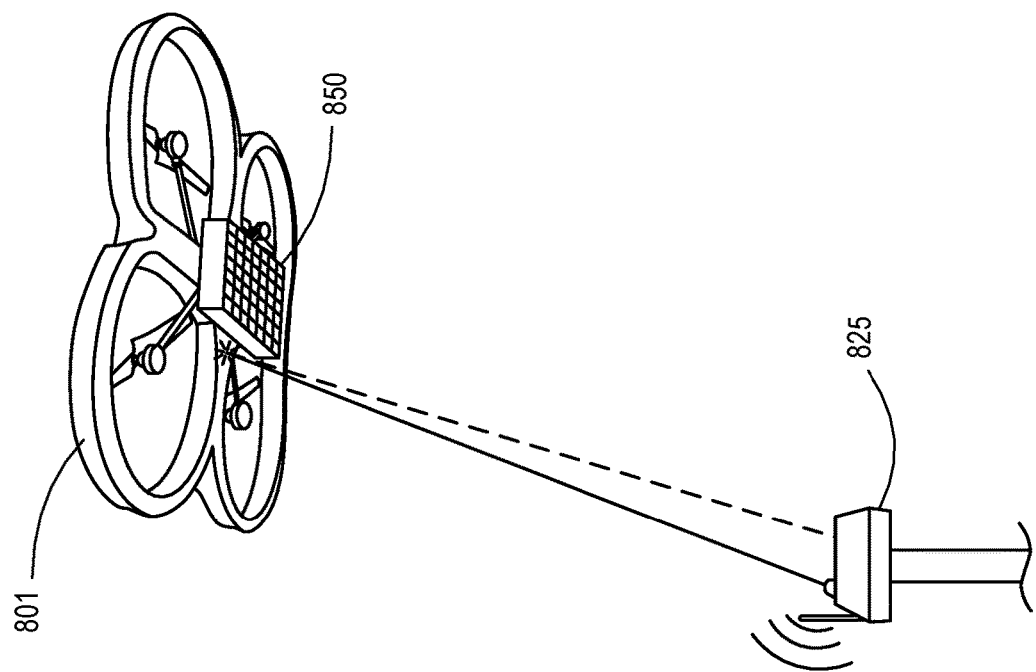
FIG. 8C illustrates a laser range finder associated with the transmitter to track a relative location of a UAV.
Figure 8C:
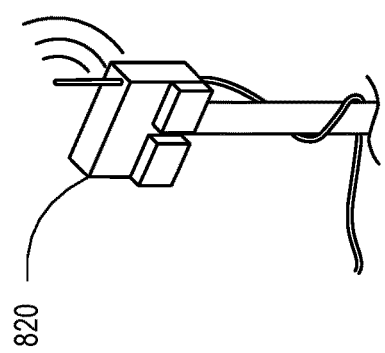

FIG. 8C illustrates another embodiment in which a laser range finder 825 associated with the transmitter 820 to track a relative location of a UAV 801.

Figure 8D:
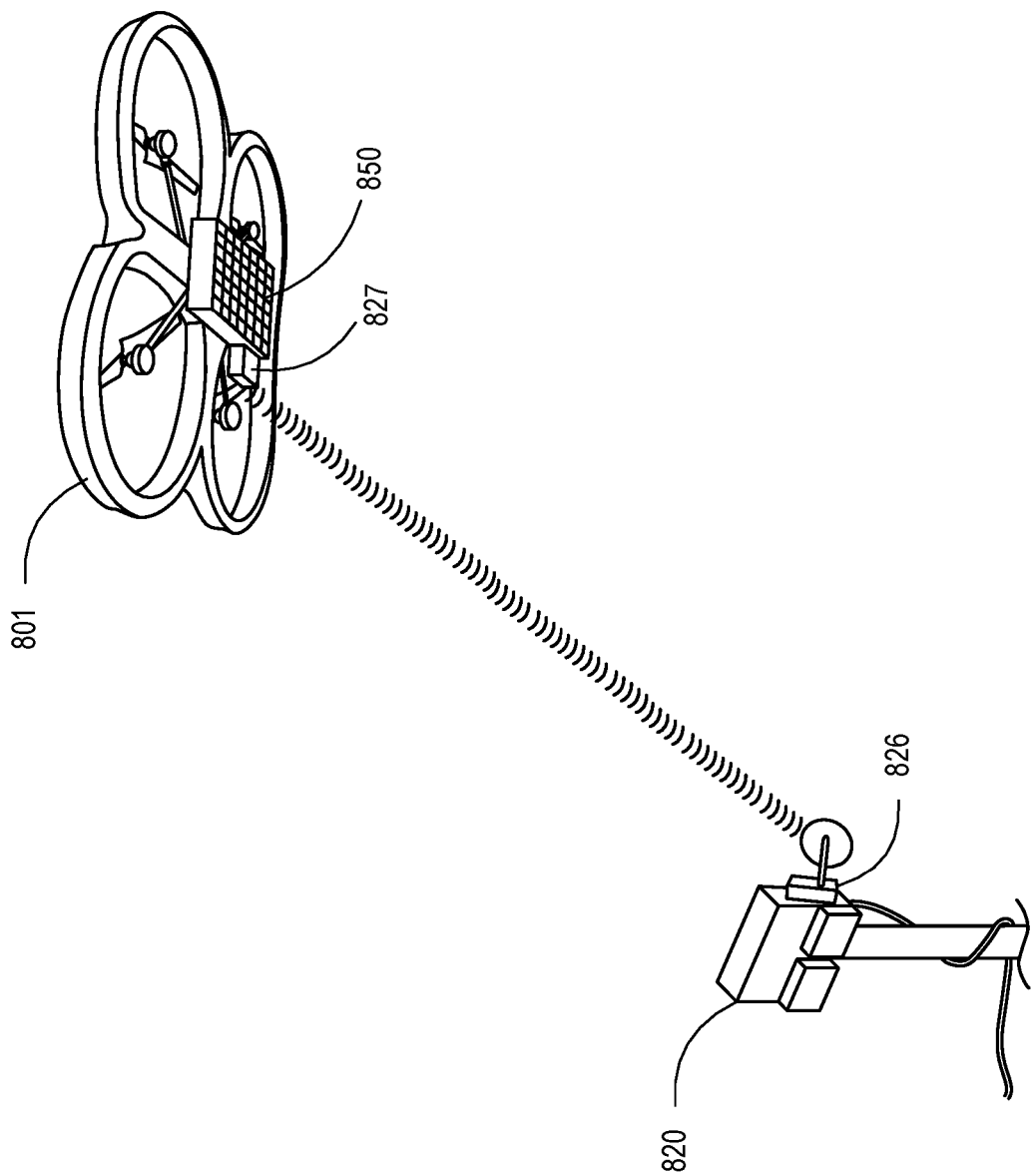
FIG. 8D illustrates a location transmitter on the UAV to provide location information to a location receiver of the transmitter.

FIG. 8D illustrates another embodiment in which a location transmitter 827 on the UAV 801 is used to provide location information to a location receiver 826 of the transmitter 820. The location transmitter 827 may be an active power transmitter configured to transmit a signal to the location receiver 826 of the transmitter 820. Alternatively, the location transmitter 827 may be a passive device configure to modulate received signal. Location receiver 826 may receive the modulated received signals to determine a relative location of the UAV 810.

Figure 8E:
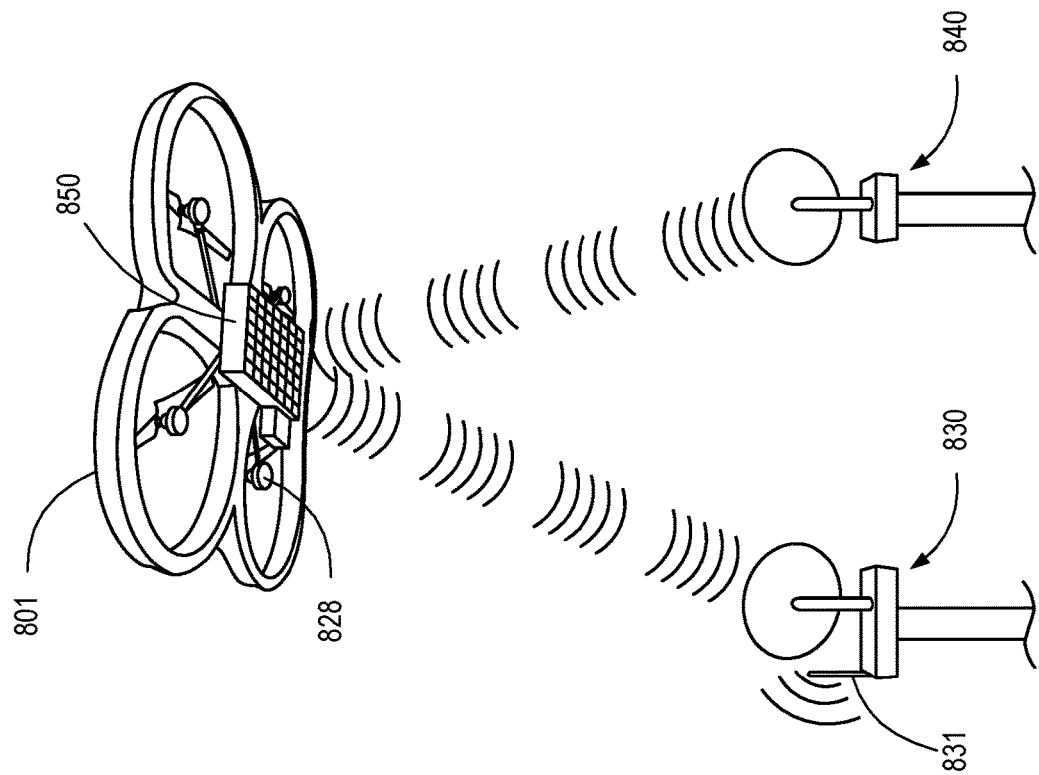
FIG. 8E illustrates another embodiment of determining a location of a UAV relative to an EMR transmitter.
Figure 8E:
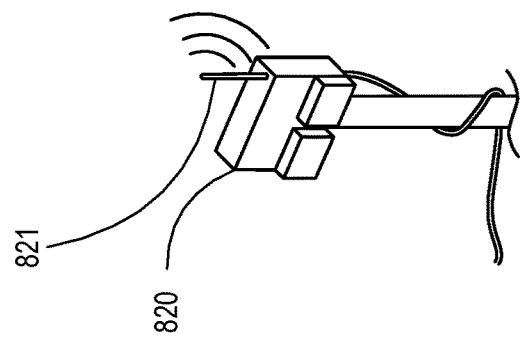

FIG. 8E illustrates another embodiment in which an external tracking system includes transmission devices 850 and receiving device 830 for identifying the location of the UAV. Information is communicated, at 821 and 831, from the external tracking system to the power transmitter 820. A device 828 on the UAV may be a reflector, transmitter, refractor, transponder, modulator, or another device to aid the external tracking system.

Figure 9:
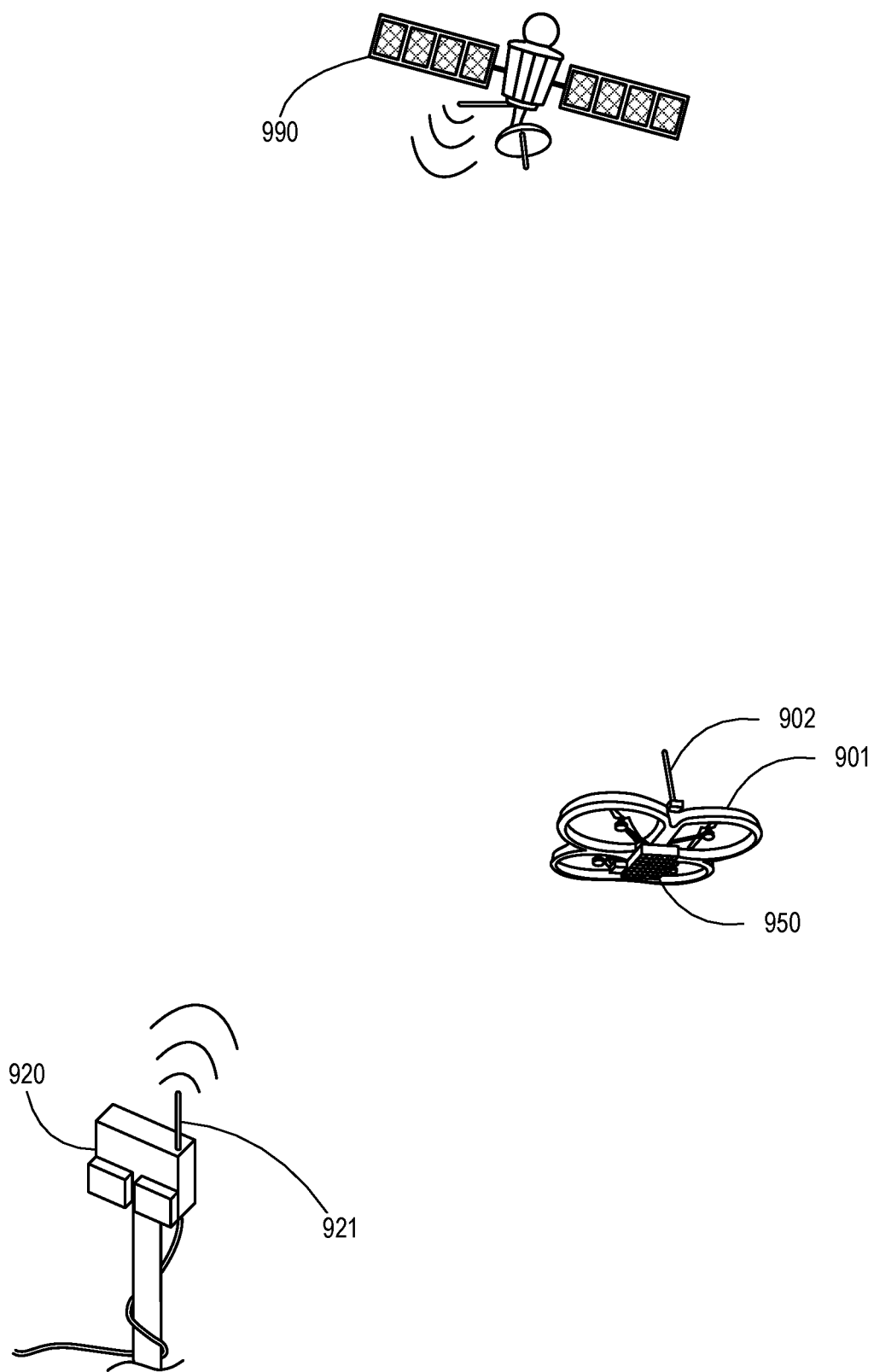
FIG. 9 illustrates a system in which a global positioning satellite GPS system is utilized to determine relative locations of the transmitter and the UAV.
Figure 10A:
FIGS. 10A-E illustrate various examples of possible multi-element receiver configurations for a UAV.
Figure 10B:
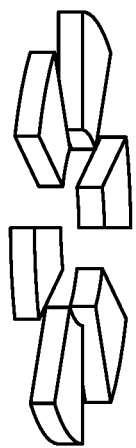
Figure 10C:
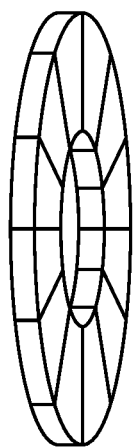
Figure 10D:
Figure 10E:
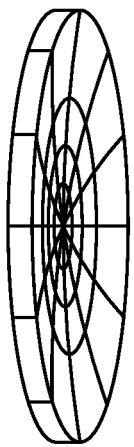

FIG. 9 illustrates a system in which a global positioning satellite GPS system 990 is utilized to determine relative locations of the transmitter 920 and the UAV 901 with a multi-element receiver 950. Each of the transmitter 920 and the UAV 901 may include GPS modules 921 and 902, respectively. In some embodiments, a GPS module 921 and/or 902 may be used to identify a rough location of the UAV and then one or more of the other approaches described herein may be utilized to further refine the location of the UAV.

In one embodiment, a rough GPS location is used to generate a first target beamform. Subsequent iterations of the target beamform may be based on determined power characteristic information. For example, a first target beam may be continually adjusted to increase or even maximize the DC power output by the EMR receiver of the UAV.

FIGS. 10A-E illustrate various examples of possible multi-element receiver configurations for a UAV. The multi-element receivers may be affixed to the underside of a UAV such that they are substantially planar, or may be alternative affixed perpendicular to the plane of a UAV. For example, in the case of a helicopter UAV, a two-sided multi-element receiver may be affixed the tail of the helicopter. Any number of sub-receivers may be affixed to any of a wide variety of locations on a UAV. IN some embodiments, receiver(s) may be pivoted and/or rotated while attached to the UAV to improve power reception.

Figure 11:
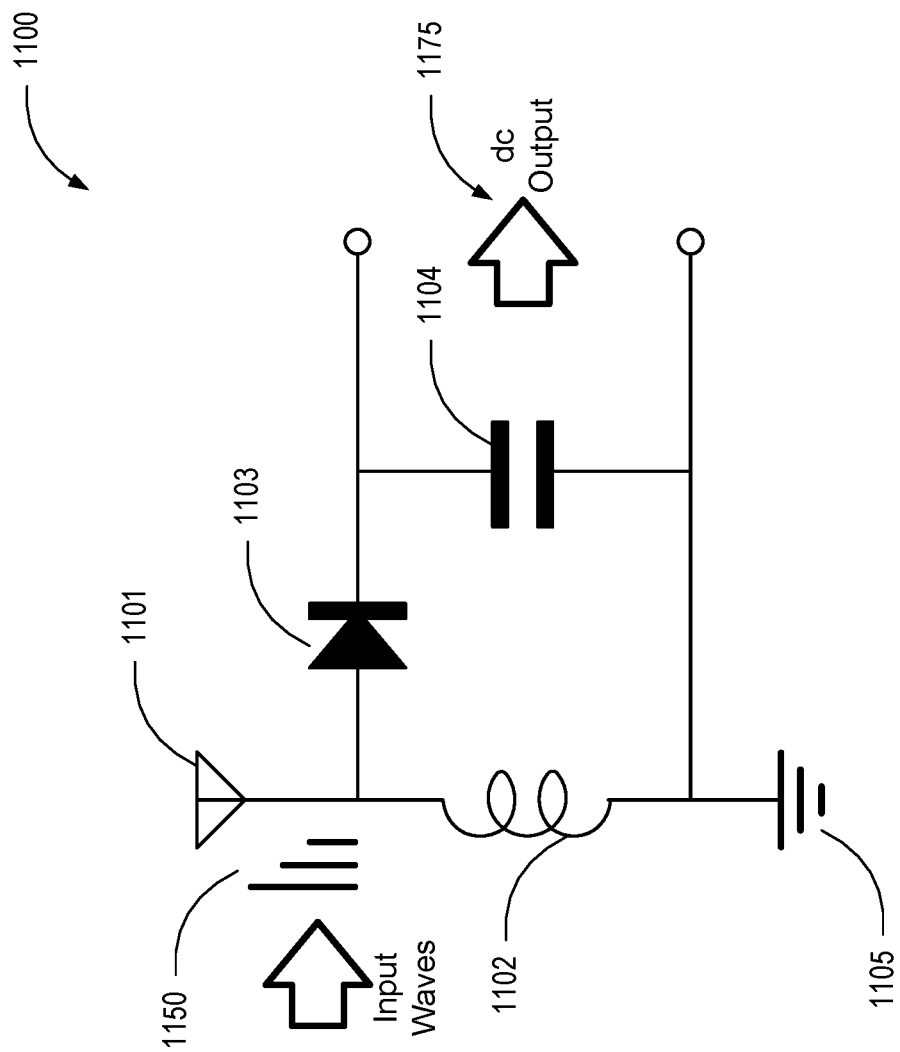
FIG. 11 illustrates an example of a harvester element of a multi-element receiver.

FIG. 11 illustrates an example of a harvester element 1100 of a multi-element receiver. A multi-element receiver may include any number of harvester elements 1100 to convert received EMR into an electric current. The output electric current may be provided to any of a wide variety of energy storage devices or energy consumption devices associated with any of a wide variety of target devices. For instance, a plurality of harvester elements 1100 may be part of a multi-element receiver connected to a mobile phone, a UAV, a laptop, a vehicle, or the like.

As illustrated, input EMR 1150 may be received by an antenna element 1101. An inductor 1102, diode 1103, and a capacitor 1104 connected to a negative terminal and/or ground 1105 may be used to convert received EMR to a DC output 1175. FIG. 11 is intended to show one basic example of EMR-to-DC power conversion and is not intended to be limited in any way. More complex approaches to rectification and power conversion are not only possible but are highly likely to be employed in the various embodiments of this disclosure. Less complex approaches may also be employed. For example, an alternative harvester element may consist of an antenna element 1101 and a diode 1103 to convert input EMR 1150 to a DC output 1175.

Figure 12A:
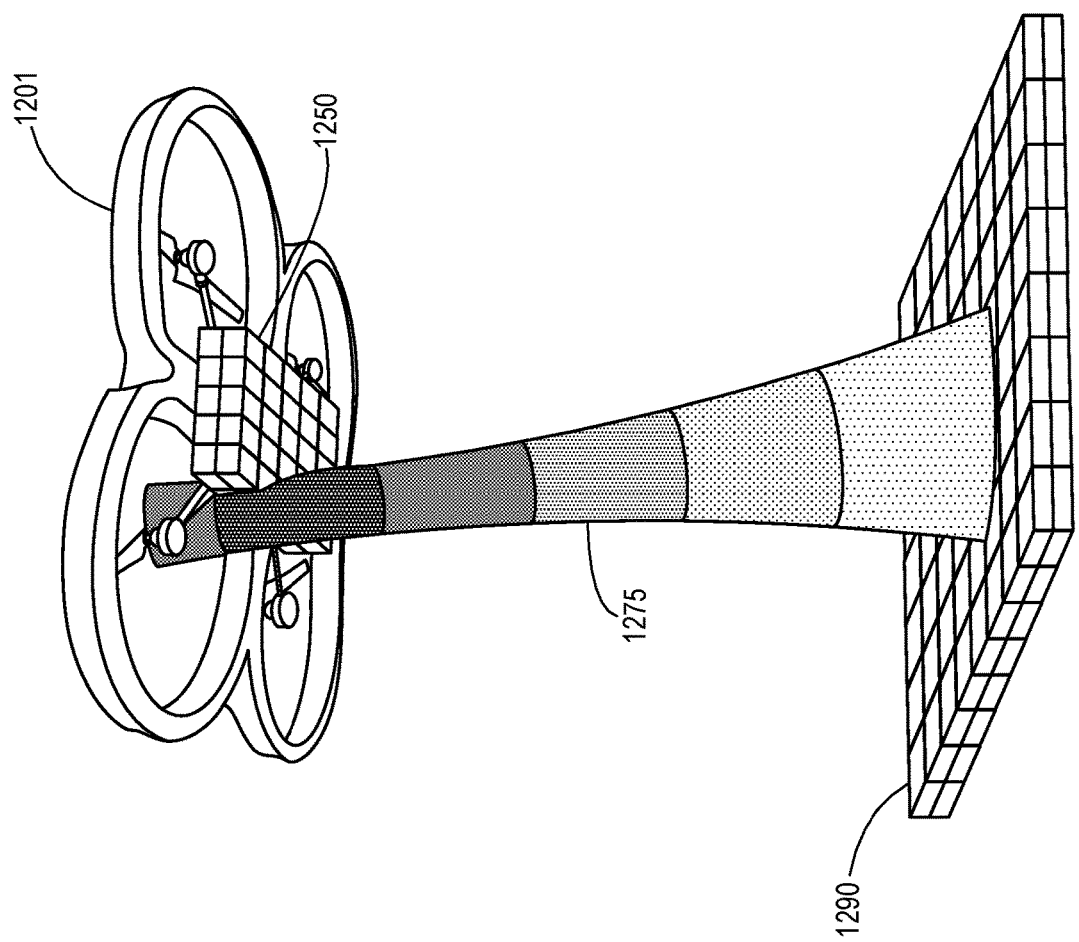
FIG. 12A illustrates an example of a beam from a transmitter that is not efficiently powering a UAV.

FIG. 12A illustrates an example of a beam 1275 from a metasurface transmitter 1290 that is not efficiently powering a UAV 1201 because it is not centered or even fully incident on the multi-element receiver 1250.

Figure 12B:
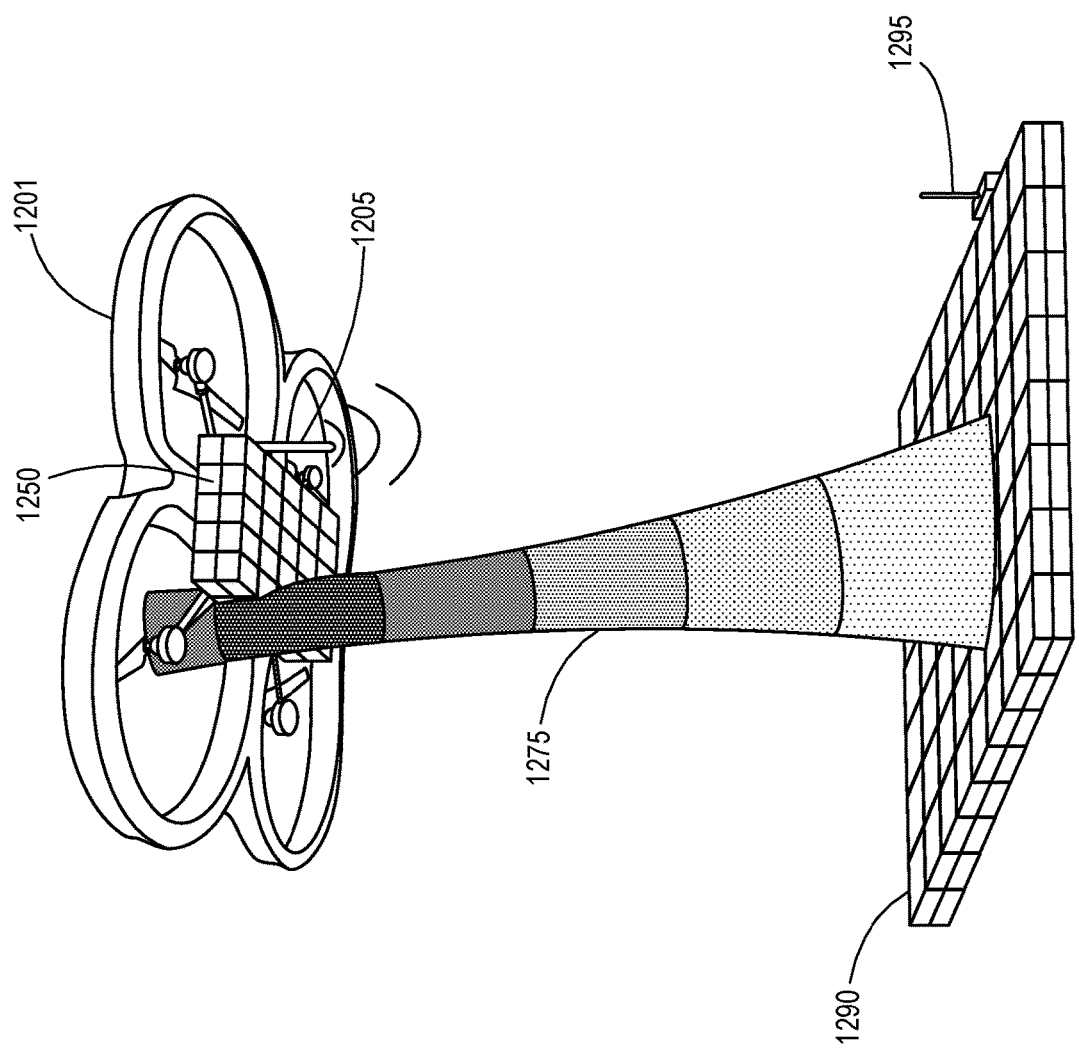
FIG. 12B illustrates the UAV transmitting a signal with power characteristic information to the transmitter.

FIG. 12B illustrates the UAV 1201 transmitting, at 1205, a signal with power characteristic information to a receiver 1295 of the metasurface transmitter 1290. As described above, the power characteristic information may include any of a wide variety of information types to directly or indirectly determine power output and/or thermal characteristics of the EMR receiver 1250.

Figure 12C:
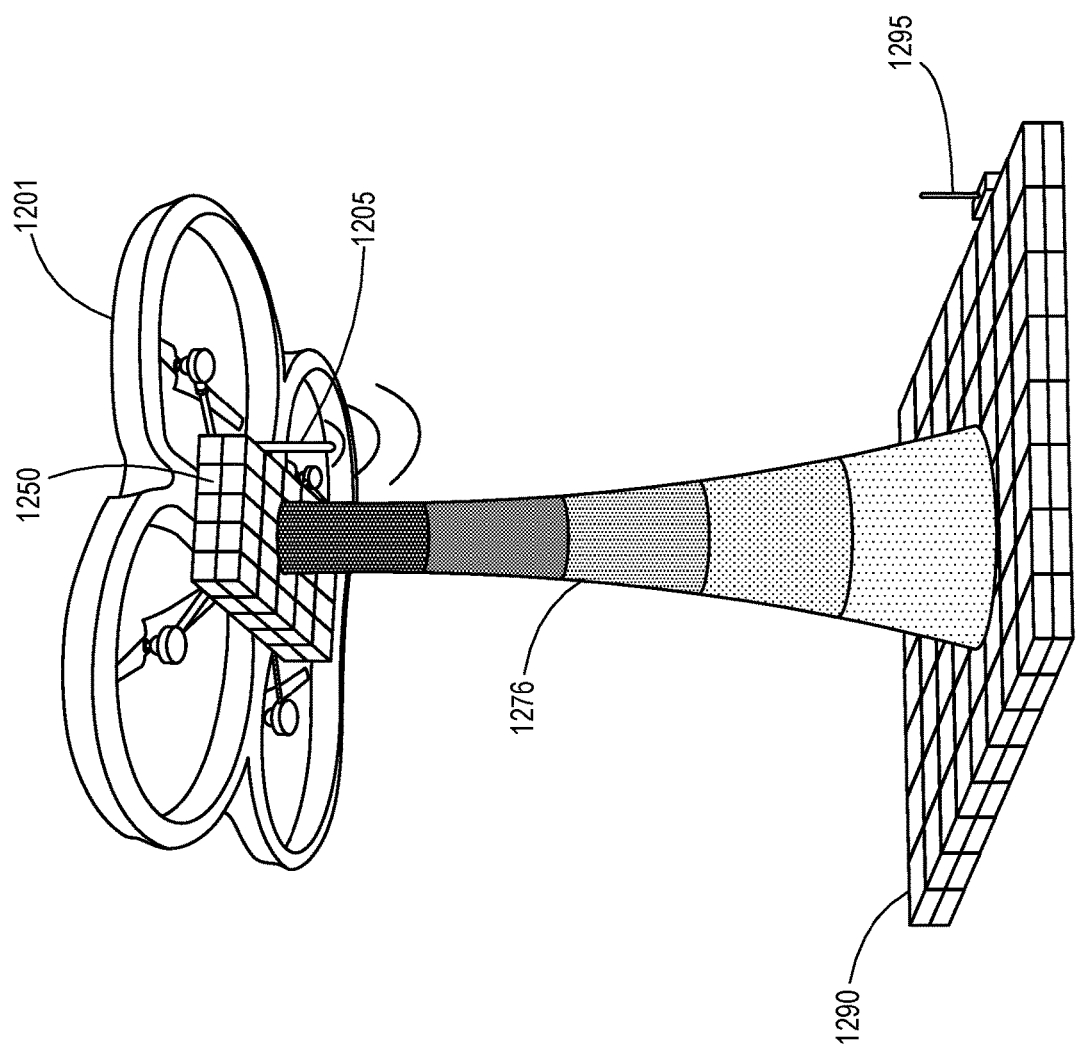
FIG. 12C illustrates the transmitter adjusting the beam based on the received power characteristic.

FIG. 12C illustrates the metasurface transmitter 1290 with an adjusted beam 1276 based on the power characteristic received at 1295. As described herein, updated power characteristic information may be provided with the adjusted beam 1276 centered. The updated power characteristic information may indicate that the focused beam should be widened to more uniformly power the receiver 1250. Further updates to the power characteristic information may indicate that a non-Gaussian beam should be used to further improve (e.g., maximize or increase efficiency) of the power conversion without exceeding a threshold limitation associated with temperature and/or maximum intensity rating.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims.

What is claimed is:

1. A method for providing wireless power to an unmanned aerial vehicle, comprising:
    receiving location data of a target device relative to a tunable multi-element transmitter configured to transmit electromagnetic radiation (EMR) to the target device;
    determining within which of a first distance range and a second distance range the target device is located from the tunable multi-element transmitter,
        wherein the first distance range includes distances at which a smallest achievable waist of a Gaussian beam of the EMR transmitted by the tunable multi-element transmitter is larger than a multi-element EMR receiver of the target device and
        wherein the second distance range includes distances at which the smallest achievable waist of the Gaussian beam of the EMR transmitted by the tunable multi-element transmitter is smaller than the multi-element EMR receiver of the target device; and
    transmitting EMR from the tunable multi-element transmitter to the multi-element EMR receiver of the target device
        (i) using a Gaussian beamform when the target device is determined to be within the first distance range and
        (ii) using a non-Gaussian beamform when the target device is determined to be within the second distance range.

2. The method of claim 1, wherein the target device is determined to be within the second distance range such that transmitting EMR from the tunable multi-element transmitter to the multi-element EMR receiver of the target device comprises transmitting a non-Gaussian beamform.

3. The method of claim 2, wherein the receiver is divided into a plurality of sub-receivers and a combiner circuit is configured to combine power from each of the sub-receivers.

4. A system to provide wireless power to an unmanned aerial vehicle, comprising:
    a tunable multi-element transmitter to transmit electromagnetic radiation (EMR) to a target device
        (i) using a Gaussian beamform when the target device is determined to be within a first distance range and
        (ii) using a non-Gaussian beamform when the target device is determined to be within a second distance range;
    a location determination subsystem to determine a location of the target device relative to the tunable multi-element transmitter, based on received location data; and
    a range determination subsystem to determine within which of the first distance range and the second distance range the target device is located relative to the multi-element transmitter,
        wherein the first distance range includes distances at which a smallest achievable waist of a Gaussian beam of the EMR transmitted by the tunable multi-element transmitter is larger than a multi-element EMR receiver of the target device and
        wherein the second distance range includes distances at which the smallest achievable waist of the Gaussian beam of the EMR transmitted by the tunable multi-element transmitter is smaller than the multi-element EMR receiver of the target device.

5. The system of claim 4, wherein the target device is an unmanned aerial vehicle (UAV).

6. The system of claim 5, wherein the receiver comprises a multi-element receive aperture.

7. The system of claim 6, wherein the multi-element receive aperture comprises a plurality of harvester elements configured to convert EMR to an electric current.

8. The system of claim 4, further comprising a power monitoring system to receive an indication of a power characteristic of an electric current produced from the EMR received by the receiver of the target device.

9. The system of claim 8, wherein the indication of the power characteristic comprises a temperature measurement.

10. The system of claim 8, wherein the indication of the power characteristic comprises a temperature measurement associated with the target device, and wherein the system further comprises an infrared camera to capture the temperature measurement.

11. The system of claim 8, wherein the power characteristic comprises a voltage characteristic of the electric current.

12. The system of claim 11, wherein the voltage characteristic comprises a root mean square (RMS) voltage.

13. The system of claim 8, wherein the power characteristic comprises a current characteristic of the electric current produced from the received EMR by the receiver.

14. The system of claim 4, wherein the location data comprises data received from a camera viewing the target device.

15. The system of claim 4, wherein the location data comprises data obtained from images captured by a camera on the target device.

16. The system of claim 4, wherein the location data comprises data from the target device.

17. The system of claim 16, wherein the location data is provided by one or more transponders on the target device.

18. The system of claim 17, wherein the location data is obtained by transmitting a query signal to the target device and receiving a response signal from the one or more transponders on the target device.

19. The system of claim 16, wherein the location data comprises a relative location and an orientation of the target device.

20. The system of claim 16, wherein the location determination subsystem is configured to determine a relative location based on a relative time-of-flight measurement of a received signal.

21. The system of claim 16, wherein the location determination subsystem is configured to determine a relative location based on a time-of-flight measurement of a received signal.

22. The system of claim 16, wherein the location determination subsystem is configured to determine a relative location based on a phase-offset measurement of a received signal.

23. The system of claim 16, wherein the location determination subsystem is configured to determine a relative location based on a code phase shift measurement of a received signal.

24. The system of claim 16, wherein the location determination subsystem is configured to determine a relative location based on a code phase delay measurement of a received signal.

25. The system of claim 16, wherein the location determination subsystem is configured to determine a relative location based on a frequency-offset measurement of a received signal.

26. The system of claim 16, wherein the location determination subsystem is configured to determine a relative location based on an angle-of-arrival measurement of a received signal.

27. The system of claim 4, further comprising a beamform calculator to determine the target, non-Gaussian beamform when the target device is determined within the second distance range.

28. The system of claim 27, wherein the beamform calculator is configured to determine the target beamform by calculating the target beamform using nonlinear multiple-input-multiple-output (MIMO) techniques.

29. The system of claim 27, wherein the beamform calculator is configured to determine the target beamform by calculating the target beamform using nonlinear time-reversal beamform calculation techniques.

30. The system of claim 27, wherein the beamform calculator is configured to determine the target beamform having a non-Gaussian field distribution that approximates a ring-shaped distribution of EMR incident on the receiver of the target device.

31. The system of claim 27, wherein the beamform calculator is configured to determine the target beamform based on a weighted function of (i) uniformly distributing EMR incident on the receiver and (ii) reducing spillover EMR on the edges of the receiver.

* * * * *